(12) United States Patent
Cruz Gonzalez et al.

(10) Patent No.: US 11,536,408 B1
(45) Date of Patent: Dec. 27, 2022

(54) DRAIN-PIPE INTERFACE DEVICE

(71) Applicant: Plumbers Umbrella Ltd., Aurora, CO (US)

(72) Inventors: Josue Emmanuel Cruz Gonzalez, Aurora, CO (US); Veronica S. Cruz, Aurora, CO (US)

(73) Assignee: PLUMBERS UMBRELLA LTD., Aurora, CO (US)

( * ) Notice: Subject to any disclaimer, the term of this patent is extended or adjusted under 35 U.S.C. 154(b) by 0 days.

(21) Appl. No.: 17/751,552

(22) Filed: May 23, 2022

(51) Int. Cl.
| | |
|---|---|
| *F16L 41/10* | (2006.01) |
| *F16L 9/00* | (2006.01) |
| *F16L 41/02* | (2006.01) |
| *E03C 1/302* | (2006.01) |

(52) U.S. Cl.
CPC ............... *F16L 41/10* (2013.01); *F16L 9/006* (2013.01); *F16L 41/021* (2013.01); *E03C 1/302* (2013.01)

(58) Field of Classification Search
CPC ..... F16L 41/10; F16L 19/0237; F16L 41/021; F16L 41/04; F16L 47/13
USPC ............................................... 285/133.4, 192
See application file for complete search history.

(56) References Cited

U.S. PATENT DOCUMENTS

| | | | | |
|---|---|---|---|---|
| 1,825,034 | A * | 9/1931 | Weatherhead, Jr. .... | F16L 19/04 285/133.4 |
| 2,039,467 | A * | 5/1936 | Walsh ..................... | E03C 1/302 15/104.33 |
| 2,690,232 | A * | 9/1954 | Brem ...................... | E03C 1/282 210/450 |
| 4,371,991 | A * | 2/1983 | Schrott .................... | E03C 1/30 4/679 |
| 5,988,188 | A | 11/1999 | Born | |
| 6,295,659 | B1 | 10/2001 | Sandness | |
| 9,708,804 | B2 | 7/2017 | Palmer | |
| 10,508,427 | B2 | 12/2019 | Sfredel et al. | |
| 10,570,596 | B1 | 2/2020 | Schneck et al. | |
| 2014/0304901 | A1* | 10/2014 | Salzer ..................... | E03C 1/304 4/255.04 |
| 2019/0247897 | A1 | 8/2019 | Rechlin | |
| 2021/0041138 | A1 | 2/2021 | Rechlin | |
| 2021/0047816 | A1* | 2/2021 | Pilarczyk ................ | F16L 27/04 |
| 2021/0180303 | A1* | 6/2021 | Sesser ................. | F16L 27/1273 |

FOREIGN PATENT DOCUMENTS

| | | | |
|---|---|---|---|
| DE | 33 29 752 A1 * | 3/1985 | ............. F16L 19/06 |
| JP | 2006207371 A | 8/2006 | |
| KR | 101845693 B1 | 4/2018 | |
| KR | 102253102 | 5/2021 | |
| WO | 2018191365 A1 | 10/2018 | |

* cited by examiner

*Primary Examiner* — James M Hewitt, II
(74) *Attorney, Agent, or Firm* — Stephen B. Katsaros; Patent Engineering, LLC

(57) ABSTRACT

A drain-pipe interface device is disclosed. The drain-pipe interface device may include a hollow profile defining a threaded portion located on an outer surface the hollow profile. The threaded portion is configured to engage with an opening associated with a drain-pipe, to couple the drain-pipe interface device with the opening. The drain-pipe interface device may further include a handle provided on the hollow profile. The handle may be used to rotate the drain-pipe interface device couple with the opening.

19 Claims, 22 Drawing Sheets

DRAIN-PIPE INTERFACE DEVICE

TECHNICAL FIELD

This disclosure relates generally to servicing of drain-pipes, and particularly to a drain-pipe interface device for servicing a drain-pipe.

BACKGROUND

Drain-pipes occasionally become partially or completely clogged due to the accumulation of hair, food particles, dirt, grease, oil, and other material. This partial or complete blocking of drain-pipes may further lead to bacteria, algae, and debris buildup. Therefore, the drain-pipes may require regular servicing in order to remove the clogging.

SUMMARY

In a typical plumbing system, a drain-pipe may connect to outlets of different plumbing equipment such as sink, basin, tub, and plumbing equipment, through different passages or pipes. In order to service the drain-pipe, servicing equipment like a cleaning-snake or a wired inspection camera may be used that may be inserted into the drain-pipe. Usage of such serving equipment may pose various challenges. To this end, a drain-pipe interface device is disclosed. The drain-pipe interface device is configured to temporarily couple with the drain-pipe, for example via threaded coupling, via an opening associated with the drain-pipe. The drain-pipe interface device covers the vulnerable edges of the opening thereby acting as a shield for the opening of the drain-pipe to prevent it from being damaged by the servicing equipment.

Further, the drain-pipe interface device curtails the egress of waste-water, for example from a toilet, through the opening, to thereby prevent the waste-water from coming into contact with the servicing personnel located in proximity to the opening. The drain-pipe interface device may include an elongated section that extends within the drain-pipe to curtail the egress of the water-water through the opening.

Furthermore, the drain-pipe interface device helps in removing waste-water and other waste particles that may are being carried by the servicing equipment, when the servicing equipment is being removed from the drain-pipe. The drain-pipe interface device includes a lip and ribs on an inner surface of the drain-pipe interface device, that help to shake off and therefore cut-off egress of the waste-water and other waste particles being carried by the servicing equipment.

In one configuration, the drain-pipe interface device may include a hollow profile. The hollow profile includes a proximal end defining a first internal diameter and a distal end defining a second internal diameter. The hollow profile further includes an outer surface and a threaded portion located on the outer surface and between the proximal and distal ends of the hollow profile. The threaded portion extends between a first end thereof towards the proximal end of the hollow profile and a second end thereof towards the distal end of the hollow profile. The threaded portion may be configured to engage with a threaded-region defined on an opening associated with a drain-pipe, to couple the drain-pipe interface device with the opening. The hollow profile may further include one or more sealing members defined on the outer surface of the hollow profile. The one or more sealing members is configured to abut against a respective wall defined on the opening, to create a leak-proof coupling of the drain-pipe interface device with the opening. The drain-pipe interface device may further include a handle attached to the hollow profile at the distal end of the hollow profile. The drain-pipe interface device is configured to be coupled with the opening via the threaded portion, upon rotation of the hollow profile by manipulating the handle.

In some configurations, the handle may include a plurality of knob elements defined around a circular profile. The handle may be configured to be manipulated via the plurality of knob elements.

In some configurations, the second internal diameter may be greater than the first internal diameter. Further, in some configurations, a cross-section of the hollow profile between the proximal end and the distal end may be configured in an exponential taper profile.

In some configurations, the one or more sealing members may include a first sealing member provided along the first end of the threaded portion and a second sealing member provided along the second end of the threaded portion. The first sealing member may define a first tapered profile and the second sealing member may define a second tapered profile.

In some configurations, a ratio of a distance (D1) between the proximal end of the hollow profile and the first end of the threaded portion to a length (L) of the hollow profile between the proximal end and the distal end thereof may be selected from a range of 1:2 to 1:3.

In some configurations, the proximal end of the hollow profile may include a lip defined along a circular periphery of the proximal end. Further, the hollow profile may include an inner surface and a plurality of ribs provided along the inner surface. The plurality of ribs may be configured to restrict egressing of water flowing through the drain-pipe, through the drain-pipe interface device when the drain-pipe interface device is coupled with the opening. The plurality of ribs may be configured to shake-off impurities from a servicing equipment (e.g. a cleaning-snake) during the removal of the servicing equipment from the drain-pipe via the drain-pipe interface device. The distal end of the hollow profile may include a tapered profile along a circular periphery of the distal end.

In some configurations, the opening may include a sleeve projecting away from the drain-pipe. The sleeve may include an inner sleeve surface. The threaded-region may be defined on the inner sleeve surface. The proximal end of the hollow profile may be configured to be inserted into the opening of a T-connector. The T-connector may include a first outlet for receiving a first section of the drain-pipe, a second outlet for receiving a second section of the drain-pipe, the second outlet being oriented opposite to the first outlet, and the opening associated with the drain-pipe, the opening defining the threaded-region.

In some configurations, a material of the drain-pipe interface device may be a Thermoplastic Polyurethane (TPU) having a Shore hardness in a range of 70 to 95.

In another configuration, an apparatus for servicing a drain-pipe is disclosed. The apparatus may include a T-connector. The T-connector may include a first outlet configured to be attached to a first section of the drain-pipe, a second outlet configured to be attached to a second section of the drain-pipe, and an opening associated with the drain-pipe, the opening defining a threaded-region. The apparatus may further include a drain-pipe interface device configured to removably couple with the T-connector. The drain-pipe interface device may include a hollow profile. The hollow profile may include a proximal end defining a first internal diameter. The drain-pipe interface device may be configured to be inserted into the opening of the T-connector, via the proximal end. The drain-pipe interface device may further include a distal end defining a second internal diameter, an outer surface, and a threaded portion located on the outer surface and between the proximal and distal ends of the hollow profile. The threaded portion may extend between a first end thereof towards the proximal end of the hollow profile and a second end thereof towards the distal end of the hollow profile. The threaded portion may be configured to engage with the threaded-region defined on the opening, to couple the drain-pipe interface device with the T-connector. The drain-pipe interface device may further include a handle defined at the distal end of the hollow profile. The drain-pipe interface device may be configured to be coupled with the T-connector via the threaded portion, upon rotation of the hollow profile by manipulating the handle.

In yet another configuration, a method of servicing a drain-pipe is disclosed. The method may include removing a lid provided on an opening associated with the drain-pipe and aligning a drain-pipe interface device with the opening. The drain-pipe interface device may include a hollow profile including a proximal end, a distal end, and an outer surface. The drain-pipe interface device may further include a threaded portion located on the outer surface and between the proximal and distal ends of the hollow profile. The threaded portion may extend between a first end thereof towards the proximal end of the hollow profile and a second end thereof towards the distal end of the hollow profile. The threaded portion may be configured to engage with a threaded-region defined on the opening, to couple the drain-pipe interface device with the opening. The drain-pipe interface device may further include one or more sealing members defined on the outer surface of the hollow profile. The one or more sealing members may be configured to abut against a respective wall defined on the opening, to create a leak-proof coupling of the drain-pipe interface device with the opening. The drain-pipe interface device may further include a handle attached to the hollow profile at the distal end of the hollow profile. The method may further include, upon aligning, rotating the drain-pipe interface device relative to the opening to couple the drain-pipe interface device with the opening via the threaded portion, by manipulating the handle.

In some configurations, the method may further include, upon coupling of the drain-pipe interface device with the opening, inserting servicing equipment in the drain-pipe via the drain-pipe interface device, for servicing the drain-pipe. The method may further include upon completion of the servicing, removing the servicing equipment from the drain-pipe, and rotating the handle of the drain-pipe interface device relative to the opening, to decouple the drain-pipe interface device from the opening. The method may further include, upon decoupling, restoring the lid on the opening.

In some configurations, removing the lid provided on the opening or decoupling the drain-pipe interface device from the opening may include rotating the lid or the drain-pipe interface device, respectively, relative to the opening in one of an anti-clockwise direction and a clockwise-direction. further, coupling the drain-pipe interface device with the opening or restoring the lid on the opening may include rotating the drain-pipe interface device or the lid, respectively, relative to the opening in the other of the anti-clockwise direction and the clockwise-direction.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, and together with the detailed description, explain the principles of the system. No attempt is made to show structural details in more detail than is necessary for a fundamental understanding of the system and various ways in which it is practiced. The following figures of the drawing include.

Figure 1:
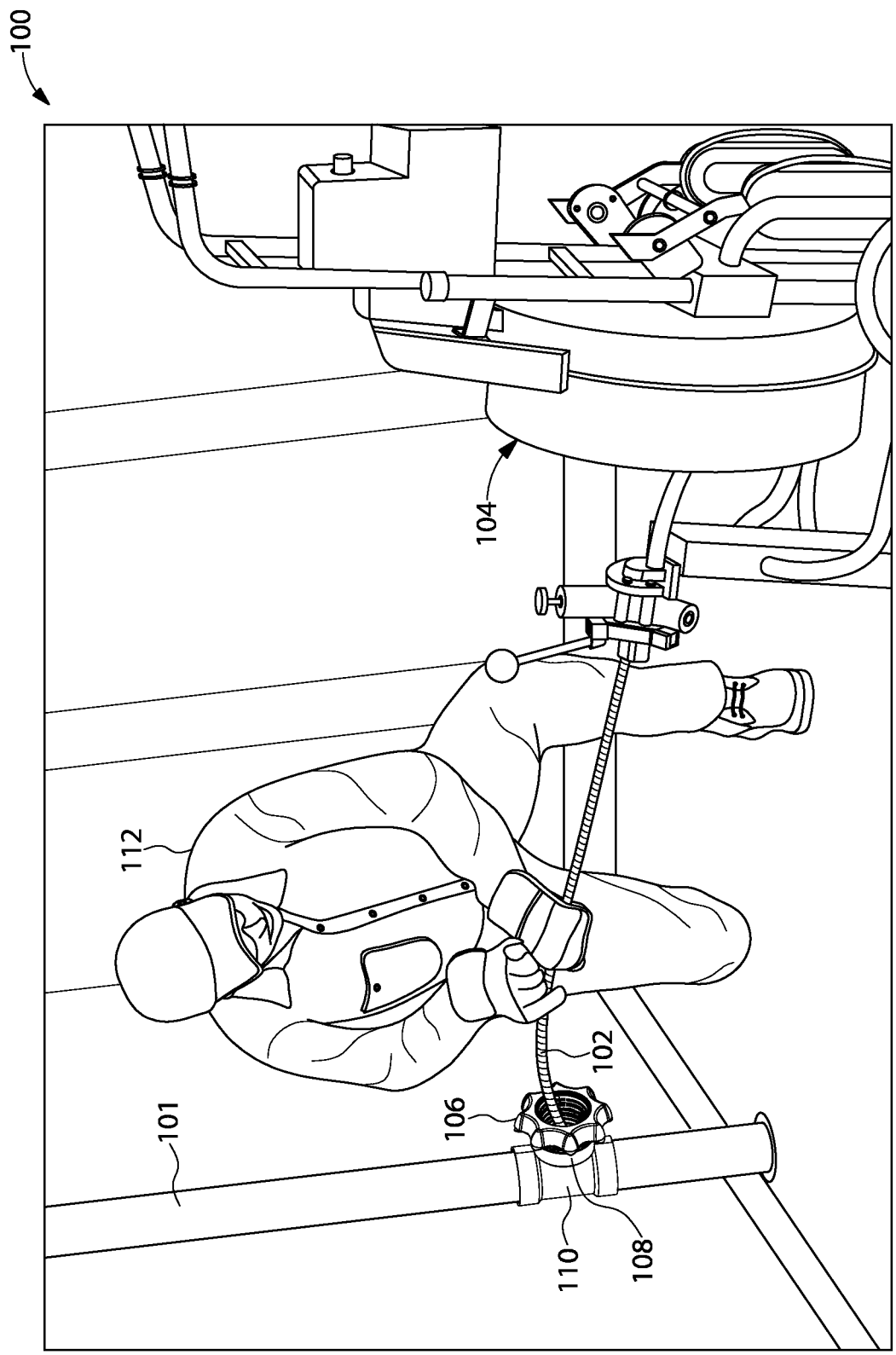
FIG. 1 illustrates a representative view of a scenario of servicing of a drain-pipe, in accordance with some illustrative configurations of the present disclosure.

In the appended figures, similar components and/or features may have the same numerical reference label. Further, various components of the same type may be distinguished by following the reference label with a letter. If only the first numerical reference label is used in the specification, the description is applicable to any one of the similar components and/or features having the same first numerical reference label irrespective of the suffix.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered as exemplary only, with the true scope and spirit being indicated by the following claims.

As mentioned above, in order to service drain-pipes, servicing equipment like a cleaning-snake or a wired inspection camera may be inserted into the drain-pipe. Usage of such serving equipment may pose various challenges. For example, during usage of the serving equipment, an opening, especially threads associated with the opening, of the drain-pipe may get damaged by rotation or rubbing action of the serving equipment. The serving equipment may chip away material from inner section of the opening. Due to this water may start leaking from opening, after the servicing is complete and the opening is covered with the lid, as the lid may not tightly fit onto the opening. Further, in closed locations, like nooks, through which the drain-pipe is installed, there may not be any provisions for the leaking water to escape by evaporation. As a result, microorganism may start growing at such moist locations.

To this end, a drain-pipe interface device is disclosed. The drain-pipe interface device is configured to temporarily couple with the drain-pipe, for example via threaded coupling, via an opening associated with the drain-pipe. The drain-pipe interface device covers the vulnerable edges of the opening thereby acting as a shield for the opening of the drain-pipe to prevent it from being damaged by the servicing equipment.

It is an objective of the present disclosure to provide the drain-pipe interface device 106 that can provide a shield to the opening 108, especially to the edges of the opening 108 to thereby prevent it from being chipped away by the cleaning-snake or any other servicing equipment. The drain-pipe interface device 106 is configured to temporarily couple with the drain-pipe 101, for example via threaded coupling, via the opening 108 and cover the vulnerable edges of the opening thereby shielding them from the cleaning-snake or any other servicing equipment.

It is another objective of the present disclosure to provide the drain-pipe interface device 106 that is capable of curtailing the egress of waste-water, for example from a toilet, through the opening 108, to thereby prevent the waste-water from coming into contact with the servicing personnel 112 located in proximity to the opening 108. As will be explained in detail in the subsequent sections of this disclosure, the drain-pipe interface device 106 includes an elongated section that extend within the drain-pipe 101 to curtail the egress of the water-water through the opening 108.

It is another yet objective of the present disclosure to provide the drain-pipe interface device 106 that is capable of removing waste-water and other waste particles being carried by the cleaning-snake 102 (or any other servicing equipment, like the inspection camera with the cable), when the cleaning-snake 102 is being removed from the drain-pipe 101. As will be explained in detail in the subsequent sections of this disclosure, the drain-pipe interface device 106 includes lip and ribs on an inner surface of the drain-pipe interface device 106, that help to shake off and therefore cut-off egress of the waste-water and other waste particles being carried by the cleaning-snake 102.

Referring now to FIG. 1, a representative view of a scenario 100 of servicing a drain-pipe 101 is illustrated. By way of an example, the servicing of the drain-pipe 101 may include inspecting the drain-pipe using a camera led by an electric cable. By way of another example, as shown in FIG. 1, the servicing on the drain-pipe 101 may be include cleaning the drain-pipe 101 using a cleaning-snake 102. As will be appreciated by those skilled art, the cleaning-snake 102 may be a hose-like element retrievable from a cleaning-snake assembly 104. The cleaning-snake assembly 104, that may be powered by an electric motor, may dispense and rotate the cleaning-snake 102, as the cleaning-snake 102 is guided in the drain-pipe 101. The cleaning-snake 102 may be configured to remove and gather dirt and other waste particles stuck in the drain-pipe 101 and blocking the passage of water through the drain-pipe 101. To this end, a cleaning brush (not shown in FIG. 1) may be attached to one end of the cleaning-snake 102, which owing to the rotation, may remove and gather dirt and other waste particles, as the brush passes across such dirt and waste particles.

The cleaning-snake 102 may be inserted in the drain-pipe 101 via an opening 108 provided on the drain-pipe 101. The opening 108 may be provided directly on the drain-pipe 101 or on a T-connector 110 fitted to the drain-pipe. This opening 108 may be otherwise covered with a lid (not shown in FIG. 1), for example, via a threaded coupling. As such, the opening 108 may include a threaded region via which the lid may be fastened to the opening 108 to thereby cover the opening 108. The lid may be removed before performing the servicing on the drain-pipe 101. Once the lid is removed, the cleaning-snake 102 may be guided into the drain-pipe 101 via the opening 108. However, as the cleaning-snake 102 passes through the opening 108, the cleaning-snake 102 may rub against the periphery of the opening 108, especially the threaded region on the opening 108. As a result of the rubbing, the edges of the opening 108 may be vulnerable to being chipped away, thereby causing permanent damage to the drain-pipe 101 or the T-connector 110.

Further, during the servicing, if a water flow, e.g. waste water from a toilet, is experienced through the drain-pipe, then such water flow may cause some water to egress through the opening 108. As a result of the egress, the water (i.e. waste water) may come into contact with an servicing personnel 112 who may be positioned in proximity to the opening 108. As will be understood, the waste-water may carry germs and impurities which upon coming into contact of the servicing personnel 112 may become a cause of various water-borne infections and diseases. A similar problem may be faced at the time of the removing the cleaning-snake 102 (or the inspection camera along with the cable). Since the cleaning-snake 102 might be carrying some waste-water and other waste particles on its surface, therefore, during removing of the cleaning-snake 102, this waste-water and other waste particles may be transferred to the servicing personnel 112.

In order to avoid or minimize the chances of occurrence of the above-mentioned damage to the drain-pipe 101 or the T-connector 110 and the undesirable egress of water from the opening 108, a drain-pipe interface device 106 may be provided. As shown in FIG. 1, the drain-pipe interface device 106 may be coupled with the opening 108, for example, via the threaded portion. The drain-pipe interface device 106 is configured to temporarily couple with the drain-pipe 101, for example via threaded coupling, via the opening 108 and cover the vulnerable edges of the opening thereby shielding them from the cleaning-snake or any other servicing equipment. Further, as will be explained in subsequent sections of the present disclosure, the drain-pipe interface device 106 helps in curtailing the egress of waste-water, for example from a toilet, through the opening 108, to thereby prevent the waste-water from coming into contact with the servicing personnel 112 positioned in proximity to the opening 108. Furthermore, the drain-pipe interface device 106 removes waste-water and other waste particles being carried by the cleaning-snake 102, when the cleaning-snake 102 is being removed from the drain-pipe 101.

Figure 2:
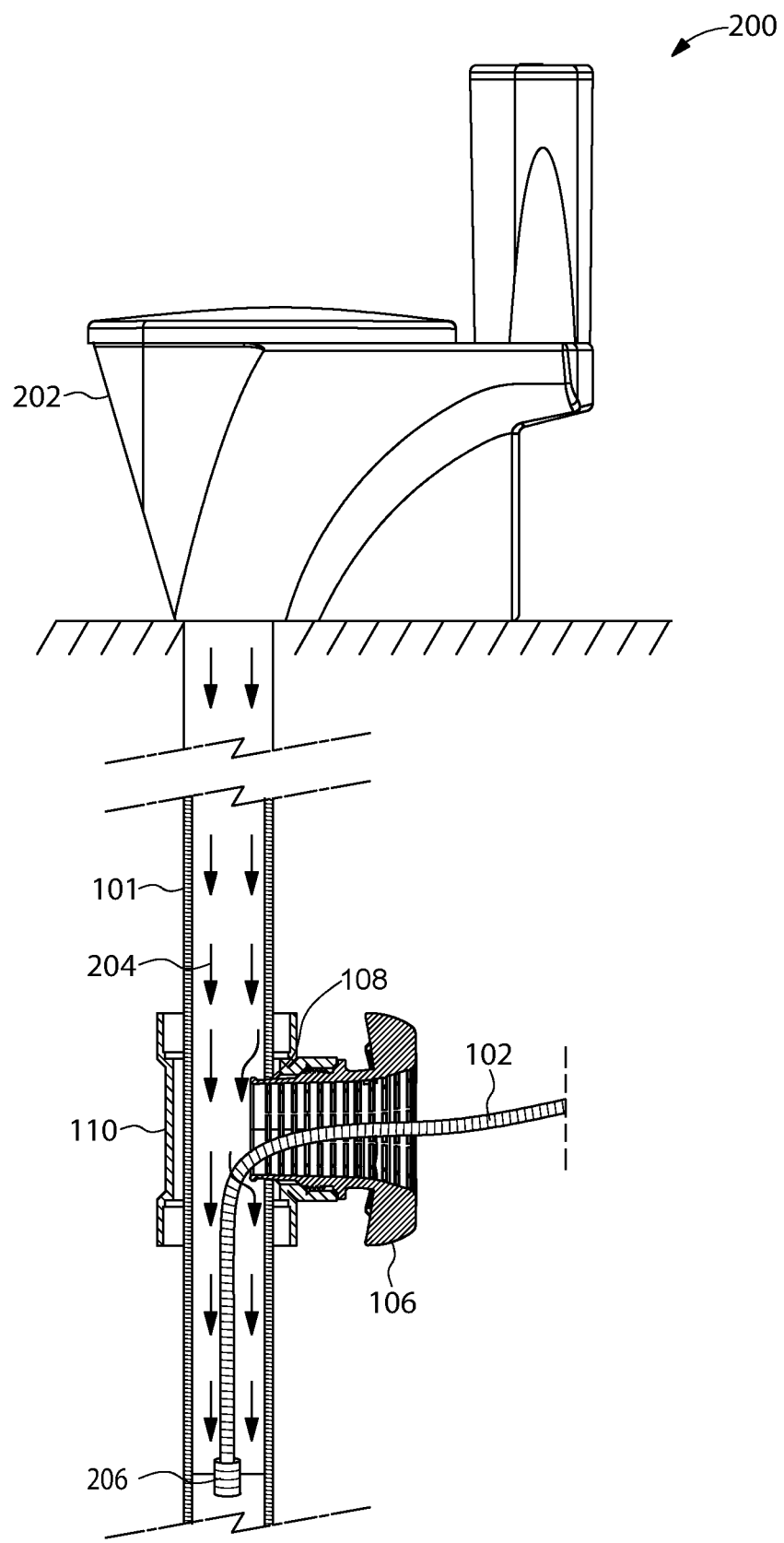
FIG. 2 illustrates a cross-sectional view of a drain-pipe layout, in accordance with some illustrative configurations of the present disclosure.

Referring now to FIG. 2, a cross-sectional view of a drain-pipe layout 200 (during servicing of the drain-pipe 101) is illustrated, in accordance with some illustrative configurations of the present disclosure. As shown in FIG. 2, the drain-pipe layout 200 includes the drain-pipe 101 and the T-connector 110. Further, the T-connector 110 defines the opening 108. During servicing, the cleaning-snake 102 may be guided into the drain-pipe 101 via the opening 108. As mentioned above, in order to service the drain-pipe 101, the drain-pipe interface device 106 may be used. The drain-pipe interface device 106 may be coupled to the opening 108. Once the drain-pipe interface device 106 is coupled to the opening 108, then, the cleaning-snake 102 may be guided into the drain-pipe 101 via the opening 108 and the drain-pipe interface device 106.

As can be seen in FIG. 2, the drain-pipe interface device 106 provides a shield to the opening 108, especially to the edges of the opening 108 thereby protecting the opening 108 from being chipped away by the cleaning-snake 102. The cleaning-snake 102 is configured to remove and gather dirt and other waste particles stuck in the drain-pipe 101 and blocking the passage of water through the drain-pipe 101. A cleaning brush 206 may be attached to one end of the cleaning-snake 102, which owing to the rotation, may remove and gather dirt and other waste particles, as the cleaning brush 206 passes across such dirt and waste particles.

The drain-pipe interface device 106 may be temporarily coupled with the drain-pipe 101, for example via threaded coupling, via the opening 108 and protect the vulnerable edges of the opening 108. Further, as shown in FIG. 2, the drain-pipe interface device 106 curtails the egress of waste-water 204, for example from a toilet seat 202, through the opening 108, to thereby prevent the waste-water 204 from coming into contact with a servicing personnel located in proximity to the opening 108. The drain-pipe interface device 106 may include an elongated section (overhang) that extends within the drain-pipe 101. As shown in FIG. 2, the elongated section (overhang) of the drain-pipe interface device 106 may cause to change direction of the flow of the waste-water 204 that may be flowing through the drain-pipe 101. As such, this elongated section (overhang) of the drain-pipe interface device 106 may curtail the egress of the water-water through the opening 108

The drain-pipe interface device 106 removes waste-water 204 and other waste particles being carried by the cleaning-snake 102, when the cleaning-snake 102 is being removed from the drain-pipe 101. For example, the drain-pipe interface device 106 may include a lip and ribs on an inner surface of the drain-pipe interface device 106, that help to shake off and therefore minimize the egress of the waste-water and other waste particles being carried by the cleaning-snake 102.

Figure 3:
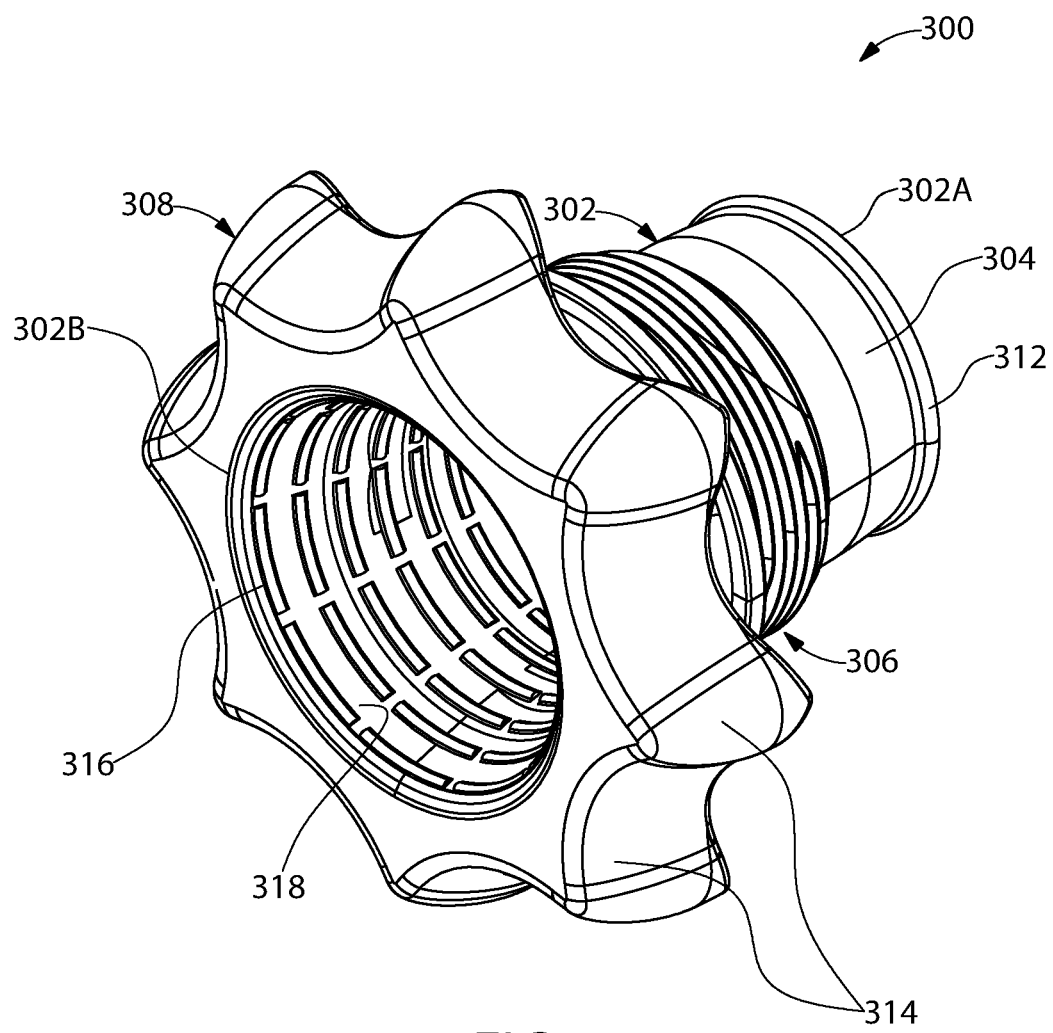
FIG. 3 illustrates a perspective view of a drain-pipe interface device, in accordance with some illustrative configurations of the present disclosure.
Figure 4:
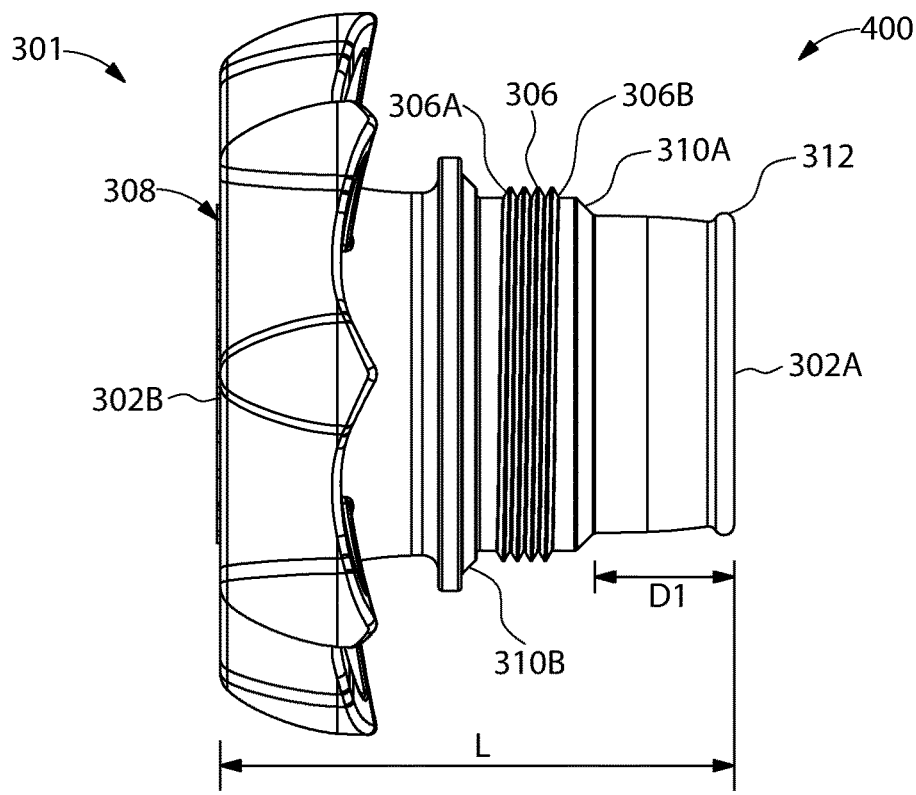
FIG. 4 illustrates a side view of the drain-pipe interface device of FIG. 3, in accordance with some illustrative configurations of the present disclosure.
Figure 5:
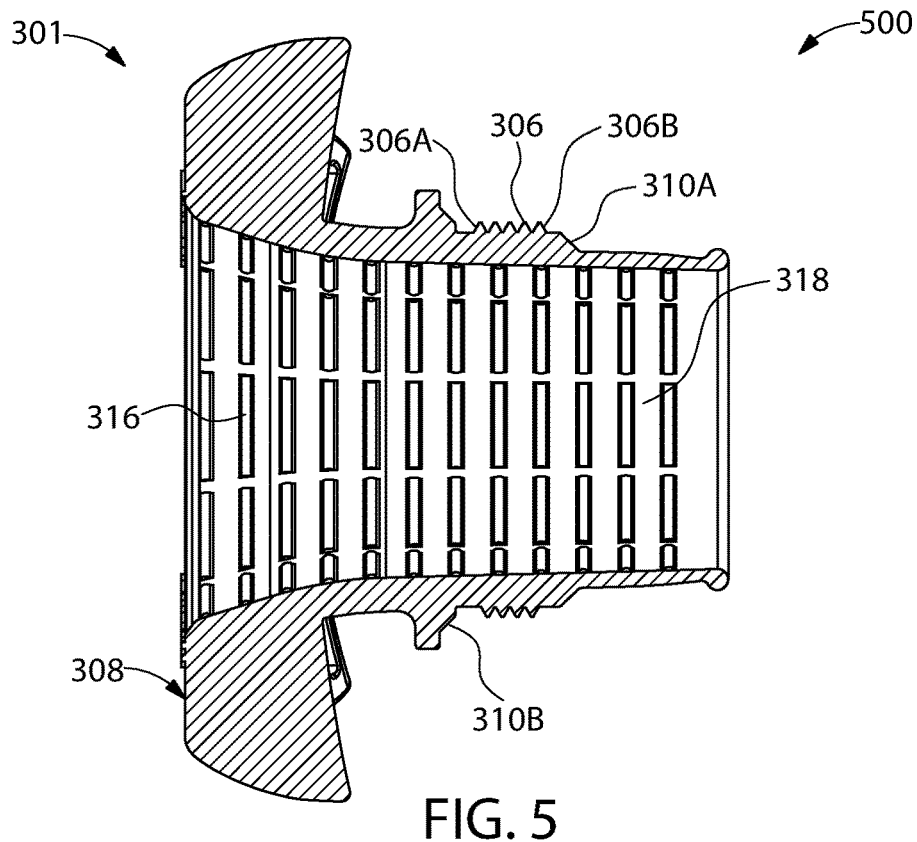
FIG. 5 illustrates a sectional side view of the drain-pipe interface device of FIG. 3, in accordance with some illustrative configurations of the present disclosure.

Referring now to FIGS. 3-5, a perspective view 300, a side view 400, and a sectional side view 500 of a drain-pipe interface device 301 (corresponding to the drain-pipe interface device 106) are illustrated in accordance with some illustrative configurations of the present disclosure. The drain-pipe interface device 301 may be manufactured from a rigid material selected from a metal, an alloy, a plastic, a polymer etc., but may not be limited thereto. Alternately, the drain-pipe interface device 301 may be manufactured from a flexible or rubbery material selected from a plastic, a polymer, or a rubber. For example, the material of the drain-pipe interface device 301 may be a Thermoplastic Polyurethane (TPU). Further, in some configurations, the drain-pipe interface device 301 may be manufactured from composite materials. Furthermore, in some configurations, the drain-pipe interface device 301 may be disposable (i.e. meant for one time usage), and therefore manufactured from low-cost materials. In some configurations, the material of the drain-pipe interface device 301 may be selected from materials having a Shore hardness in a range of 70 to 95, and preferably having a Shore hardness of 95.

In some configurations, as shown in FIGS. 3-5, the drain-pipe interface device 301 may include a hollow profile 302. The hollow profile 302, as shown in FIGS. 3-5, may have a circular cross-section. However, in alternate configurations, the hollow profile 302 may have any other cross-section as well, such as square, rectangle, etc. The hollow profile 302 may include a proximal end 302A and a distal end 302B. The proximal end 302A may define a first internal diameter, and the distal end 302B may define a second internal diameter. The hollow profile 302 may further include an outer surface 304. As such, the hollow profile 302 may have a tubular configuration extending between the first proximal end 302A and the distal end 302B.

In some configurations, the second internal diameter may be same as the first internal diameter. In other words, the diameter of the hollow profile 302 may be uniform along its length. In some alternate configurations, as shown in FIGS. 4-5, the second internal diameter may be greater than the first internal diameter. In other words, the diameter of the hollow profile 302 may vary along its length.

In some configurations, a cross-section of the hollow profile 302 between the proximal end 302A and the distal end 302B may be configured in an exponential taper profile. As will be understood, in the hollow profile 302 configured in an exponential taper profile, the diameter of the hollow profile 302 increases exponentially towards the distal end.

In some configurations (not shown in FIGS. 4-5), the cross-section of the hollow profile 302 between the proximal end 302A and the distal end 302B may be configured in linear taper profile. In the hollow profile 302 configured with the linear taper profile, the diameter of the hollow profile 302 increases linearly towards the distal end. In other words, the hollow profile 302 is configured as a conical section.

Further, in some configurations (not shown in FIGS. 4-5), the cross-section of the hollow profile 302 between the proximal end 302A and the distal end 302B may be configured in part uniform and part varying profile. As such, a first part length (e.g. half length) of the hollow profile 302 may be configured with a uniform diameter, and the second part length (e.g. remaining half length) of the hollow profile 302 may be configured with a varying diameter. In one such example configuration, for the second part length, the diameter of the hollow profile 302 may increase linearly towards the distal end. In another example configuration, for the second part length, the diameter of the hollow profile 302 may increase exponentially towards the distal end.

Figure 6:
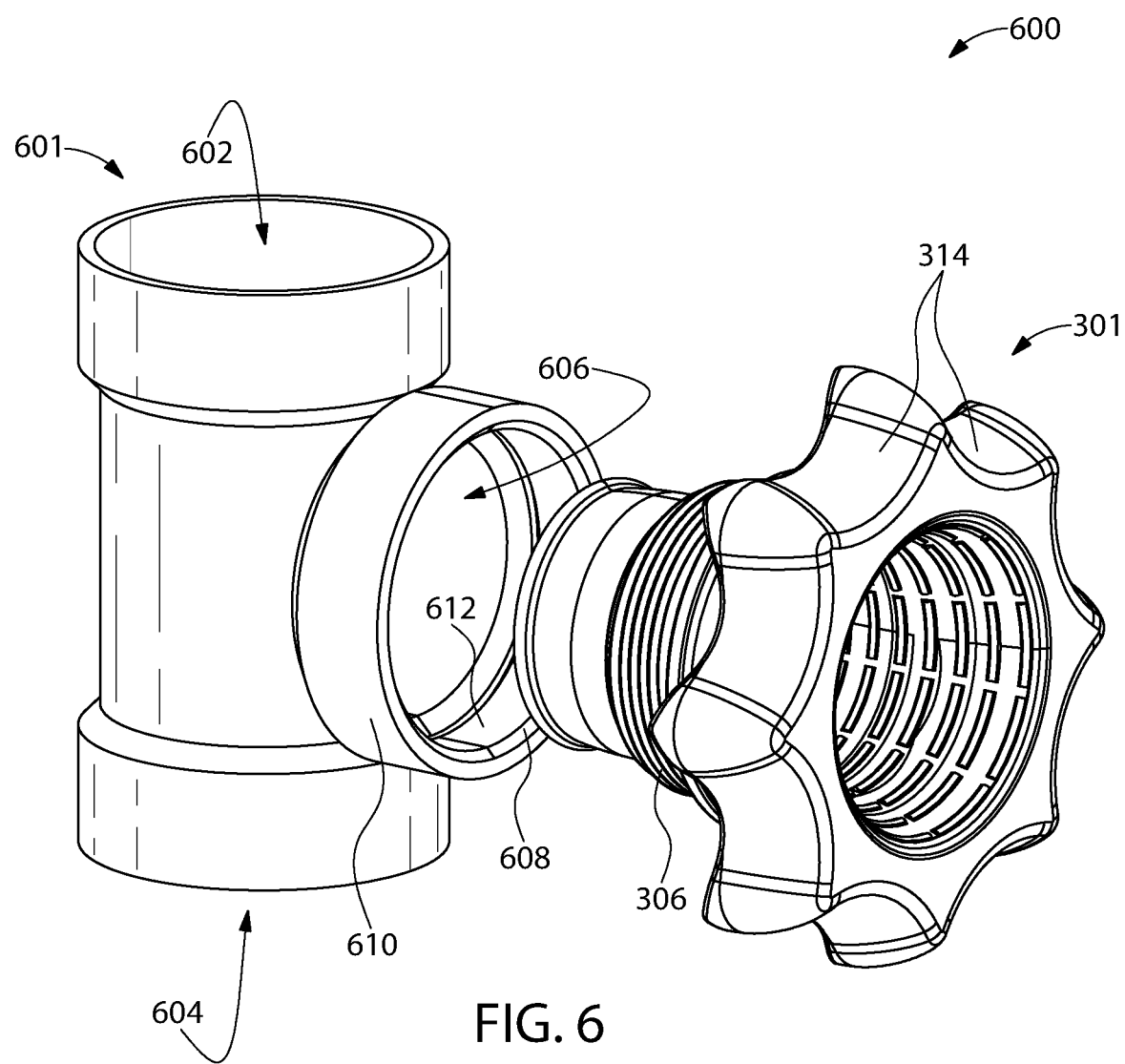
FIG. 6 illustrates an exploded view of an assembly of a T-connector and the drain-pipe interface device, in accordance with some illustrative configurations of the present disclosure.
Figure 7:
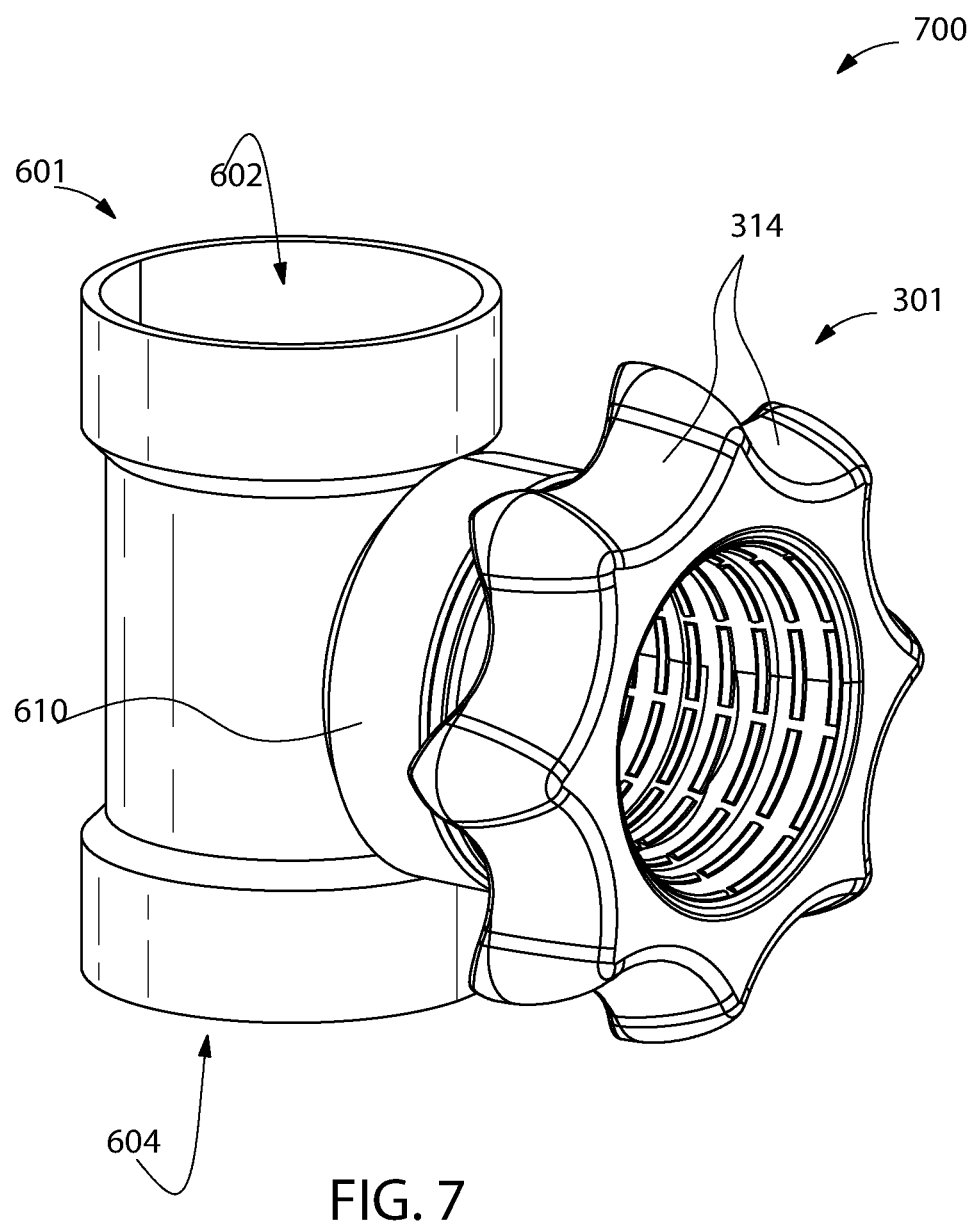
FIG. 7 illustrates an assembled view of an assembly of the T-connector and the drain-pipe interface device of FIG. 6, in accordance with some illustrative configurations of the present disclosure.
Figure 8:
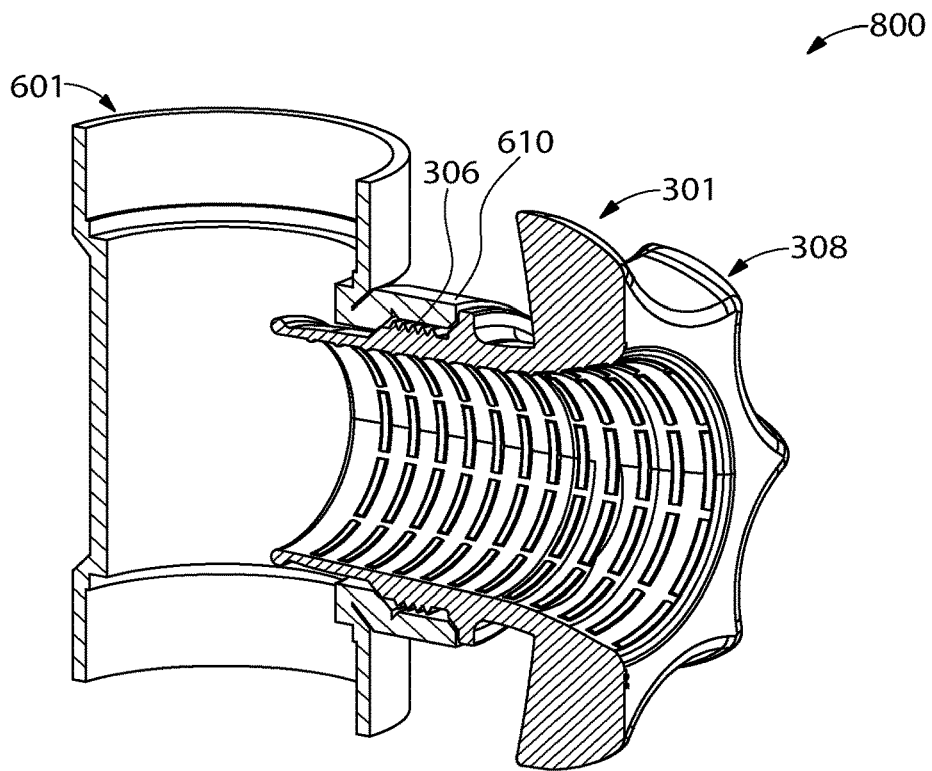
FIG. 8 illustrates an assembled sectional perspective view of the assembly of the T-connector and the drain-pipe interface device FIG. 6, in accordance with some illustrative configurations of the present disclosure.

The hollow profile 302 may further include a threaded portion 306 located on the outer surface 304. The threaded portion 306 may be located between the proximal end 302A and the distal end 302B of the hollow profile 302. The threaded portion 306 may extend between a first end 306A thereof towards the proximal end 302A of the hollow profile 302 and a second end 306B thereof towards the distal end 302B of the hollow profile 302. In some configurations, the threaded portion 306 may be formed on the outer surface 304 of the hollow profile 302. For example, the threaded portion 306 may be formed on the outer surface 304 during manufacturing by way of molding, or post-manufacturing by way of machining. As will explained in detail in conjunction with FIGS. 6-8, the threaded portion is configured to engage with a threaded-region defined on an opening associated with a drain-pipe, to couple the drain-pipe interface device with the opening.

As shown in FIG. 4, in some configurations, a ratio of a distance (D1) between the proximal end 302A of the hollow profile 302 and the first end 306A of the threaded portion 306 to a length (L) of the hollow profile 302 (i.e the length between the proximal end 302A and the distal end 302B of the hollow profile 302) may range from 1:5 to 1:2.5. In one particular example, the length (L) of the hollow profile 302 may be 200 millimeters (mm) and the distance (D1) between the proximal end 302A of the hollow profile 302 and the first end 306A of the threaded portion 306 may be 50 mm. For the length (L) of the hollow profile 302 being 200 mm, the distance (D1) may range from 40 mm to 80 mm. As such, the ratio of the length (L) to the distance (D1) may range from 1:5 to 1:2.5. It should be noted that the distance (D1) is significant for one or more reasons. Once the drain-pipe interface device 301 is coupled to the opening of the drain-pipe, a part of the length (L) of the hollow profile 302 acts as an overhang within the drain-pipe. The overhang helps curtail the egress of waste-water, for example from a toilet, through the opening, to thereby prevent the waste-water from coming into contact with the servicing personnel positioned in proximity to the opening.

Further, as shown in FIG. 4, in some configurations, the proximal end 302A of the hollow profile 302 may include a lip 312 defined along a circular periphery of the proximal end 302A. For example, the lip 312 may be a thickened section provided at the along the periphery of the proximal end 302A. The lip 312 may serve various functionalities. For example, the lip 312, by way of its shape and construction, may help in removing waste-water and other waste particles being carried by the cleaning-snake (or any other servicing equipment, like the inspection camera with the cable), when the cleaning-snake is being removed from the drain-pipe.

The lip 312 may assist in shaking off and therefore minimizing egress of the waste-water and other waste particles being carried by the cleaning-snake through the opening. Further, since the lip 312 is positioned where the cleansing snake undergoes a bend and therefore is constantly in contact with the cleaning-snake, the lip 312 is exposed to high impact and stresses. Owing to the thickened section, the lip 312 is able to bear the high impact and stresses, and therefore, prevent damage to the rest of the hollow profile 302.

In some configurations, the lip 312 may be formed into the hollow profile 302 during manufacturing. In alternate configurations, the lip 312 may be attached to the hollow profile 302 post-manufacturing, for example, by way of welding, gluing (e.g. using an adhesive), etc. To this end, the lip 312 may be provided in form of a ring like structure that may be then attached to the hollow profile 302. The lip 312 may be made from the same material as the hollow profile 302 or any other rigid material having high strength and hardness, selected from a polymer and a metal.

In continued reference to FIGS. 3 and 5, to further assist in shaking off and therefore minimizing egress of the waste-water and other waste particles, in some configurations, the hollow profile 302 may include a plurality of ribs 316 provided along an inner surface 318 of the hollow profile 302. Each of the plurality of ribs 316 may include a protrusion projecting from the inner surface 318 of the hollow profile 302. As such, in some configurations, the plurality of ribs 316 may be formed into the hollow profile 302, for example, via molding. Alternately, the plurality of ribs 316 may be attached (i.e. post-manufacturing) to the inner surface 318 of the hollow profile 302, for example, via welding, gluing, etc. The plurality of ribs 316 may be so configured to restrict the egress of water flowing through the drain-pipe, through the drain-pipe interface device 301 when the drain-pipe interface device 301 is coupled with the opening. Further, the plurality of ribs 316 may be configured to shake-off impurities from the cleaning-snake during removal of the cleaning-snake from the drain-pipe via the drain-pipe interface device 301. In some configurations, as can be seen in FIGS. 3 and 5, the plurality of ribs 316 may be spaced apart from each other by a distance. This is to allow the waste-water and the impurities that are shaken-off from the cleaning-snake to slide back into the drain-pipe, via these spaces between the plurality of ribs 316.

In some configurations, the hollow profile 302 may further include one or more sealing members 310 defined on the outer surface 304 of the hollow profile 302. The one or more sealing members 310 may be configured to abut against a respective wall defined on the opening, to create a leak-proof coupling of the drain-pipe interface device with the opening. In some configurations, as shown in FIGS. 4-5, the one or more sealing members 310 may include a first sealing member 310A and a second sealing member 310B. The first sealing member 310A may be provided along the first end 306A of the threaded portion 306. The second sealing member 310B may be provided along the second end 306B of the threaded portion 306. In some configurations, the first sealing member 310A and the second sealing member 310B may be formed on the outer surface 304 of the hollow profile 302. For example, the first sealing member 310A and the second sealing member 310B may be formed on the outer surface 304 during manufacturing by way of molding, or post-manufacturing by way of machining.

Further, in some configurations, the first sealing member 310A may define a first tapered profile. The second sealing member 310B may defines a second tapered profile. It should be noted that the first tapered profile and the second tapered profile may match the respective walls defined on the opening, so as abut against the respective walls and create a leak-proof coupling of the drain-pipe interface device 301 with the opening.

In some configurations, the first sealing member 310A and the second sealing member 310B may include a sealant lining (not shown in FIGS. 3-5) to create the leak-proof coupling of the drain-pipe interface device 301 with the opening. As will be understood, the sealant lining may be configured to act like a gasket between the first sealing member 310A or the first sealing member 310A and the respective wall of the opening. For example, the sealant lining may be made of a soft plastic or a polymer, such as silicone. Further, the sealant lining may be either attached (post-manufacturing) to the first sealing member 310A and the second sealing member 310B or may be formed within the hollow profile 302 during manufacturing of the hollow profile 302.

The drain-pipe interface device 301 may further include a handle 308 provided at the hollow profile 302 at the distal end 302B of the hollow profile 302. In some configurations, the handle 308 may be fixedly attached to the hollow profile 302. Alternately, the handle 308 may be formed with the hollow profile 302, i.e. the hollow profile 302 and the handle 308 may be formed (manufactured) as a single piece. It should be noted that the drain-pipe interface device 301 may be configured to be coupled with the opening via the threaded portion, upon rotation of the hollow profile 302 by manipulating the handle 308. Therefore, in order to threadably couple the drain-pipe interface device 301 with the opening associated the drain-pipe, the threaded portion 306 of the hollow profile 302 has to be rotated. To this end, the handle 308 may be manipulated to rotate of the hollow profile 302 to thereby couple the drain-pipe interface device 301 with the opening.

In some configurations, as shown in FIGS. 3-5, the handle 308 may include a plurality of knob elements 314 defined around a circular profile. The handle 308 may be manipulated via the plurality of knob elements 314, as the knob elements 314 allow for easy gripping and rotating by a user, so as to tightly couple the drain-pipe interface device 301 with the opening. As will be understood, the knob elements 314 may be either attached (post-manufacturing) to the hollow profile 302 or may be formed within the hollow profile 302 during manufacturing of the hollow profile 302. Further, the shape, size, and number of the knob elements 314 may vary depending on the size of overall size of the drain-pipe interface device 301. For example, as shown in FIGS. 3-5, the plurality of knob elements 314 may include 8 knob elements. It should be further noted that the material of the handle and hence the knob elements 314 may be same as the material of the drain-pipe interface device 301, and as already described above.

Referring now to FIGS. 6-9, an exploded view 600, an assembled view 700, an assembled sectional perspective view 800, and an assembled sectional side view 900 of an assembly of a T-connector 601 and the drain-pipe interface device 301 are illustrated in accordance with some illustrative configurations of the present disclosure. The drain-pipe interface device 301 is already explained above. In some configurations, as shown in FIGS. 6-9, the T-connector 601 may include a first outlet 602, a second outlet 604, and an opening 606 (corresponding to the opening 108). By way of an example, the size of the T-connector 601, i.e. the diameter of each of the first outlet 602, the second outlet 604, and the opening 606 may be 2 inches or 3 inches. The first outlet 602 may be configured to be attached to a first section of the drain-pipe (e.g. the drain 101). The second outlet 604 may be configured to be attached to a second section of the drain-pipe. The opening 606 may define a threaded-region 608. In some configurations, the T-connector 601 may include a sleeve 610 projecting away from the drain-pipe (when fitted to the drain-pipe). The sleeve 610 may include an inner sleeve surface 612. In such configurations, the threaded-region may be defined on the inner sleeve surface 612.

The T-connector 601 may be manufactured from a rigid material selected from a metal, an alloy, a plastic, a polymer etc., but may not be limited thereto. Alternately, the T-connector 601 may be manufactured from a flexible or rubbery material selected from a plastic, a polymer, or a rubber, but may not be limited thereto. For example, the material of the T-connector 601 may be a Thermoplastic Polyurethane (TPU). Further, in some configurations, the T-connector 601 may be manufactured from a combination of multiple materials, i.e. composite materials. Furthermore, in some configurations, the T-connector 601 may be disposable (i.e. meant for one time usage), and therefore manufactured from low-cost materials. In some configurations, the material of the T-connector 601 may be selected from materials having a Shore hardness in a range of 70 to 95, and preferably having a Shore hardness of 95.

As mentioned above, the hollow profile 302 of the drain-pipe interface device 301 includes a threaded portion 306 located on its outer surface 304. The threaded portion 306 is configured to engage with the threaded-region 608 defined on the opening 606 associated with the T-connector 601, to couple the drain-pipe interface device 301 with the opening 606. It should be noted that the T-connector 601 may be off-shelf available product having standard dimensions. Further, the T-connector 601 may be available in different standard shapes and sizes. Accordingly, the drain-pipe interface device 301 may be manufactured with standard dimensions to match the T-connector 601. Therefore, when the drain-pipe is to be serviced, the servicing personnel (e.g. a plumber) may first temporarily install the drain-pipe interface device 301 on the drain-pipe, before performing the service, for the reasons discussed above.

In another implementation of the present disclosure, the assembly of the assembly of the T-connector 601 and the drain-pipe interface device 301 is provided. As will be understood, in such implementations, the T-connector 601 may be fitted to the drain-pipe at the time of installation of the drain-pipe. As such, the T-connector 601 may be provided with standard dimensions to allow the T-connector 601 to be attached to the standard-sized drain-pipes. Further, when the drain-pipe requires servicing, the drain-pipe interface device 301 may be coupled with the T-connector 601, before servicing the drain-pipe.

In order to couple drain-pipe interface device 301 with the opening 606 (of the T-connector 601, the drain-pipe interface device 301 may be first aligned with the opening 606, and then rotated to cause the threaded portion 306 to engage with the threaded-region 608 defined on the opening 606 associated with a the T-connector 601, to couple the drain-pipe interface device 301 with the T-connector 601. As mentioned above, the drain-pipe interface device 301 may be rotated by manipulating the handle 308 of the drain-pipe interface device 301. For example, the handle 308 may be manipulated via the plurality of knob elements 314, as the knob elements 314 allow for easy gripping and rotating by a user, so as to tightly couple the drain-pipe interface device 301 with the opening.

Figure 9:
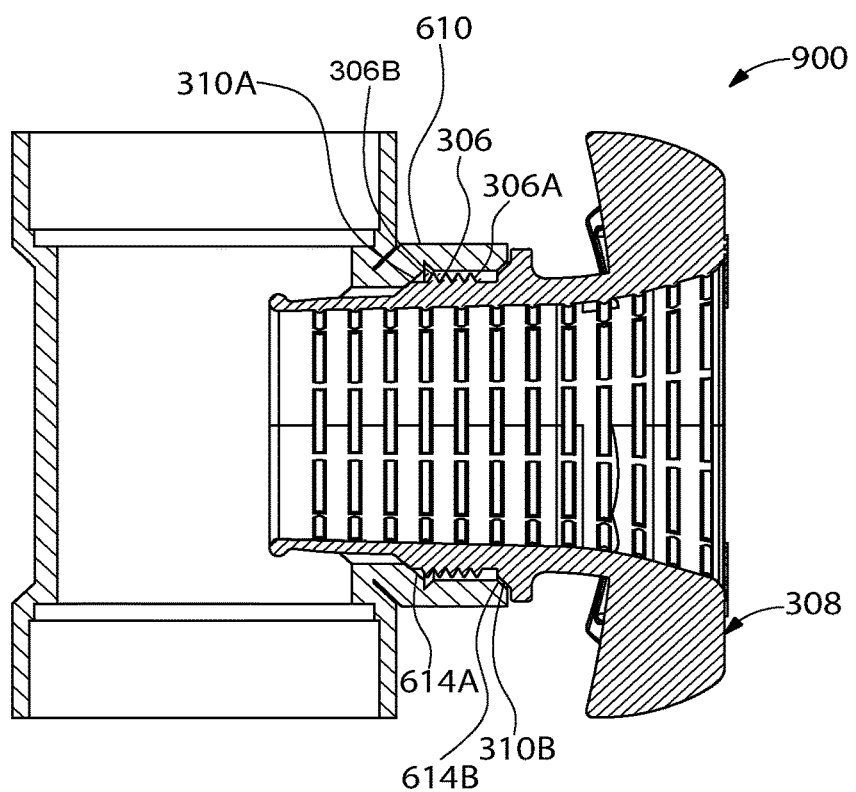
FIG. 9 illustrates an assembled sectional side view of the assembly of the T-connector and the drain-pipe interface device FIG. 6, in accordance with some illustrative configurations of the present disclosure.

As shown in FIG. 9, and as mentioned above, once the drain-pipe interface device 301 is coupled to the opening 606, a part of the length (L) of the hollow profile 302 acts as an overhang within the drain-pipe. The overhang helps curtail the egress of waste-water, for example from a toilet, through the opening 606, to thereby prevent the waste-water from coming into contact with the servicing personnel located in proximity to the opening 606. To allow this overhang, a ratio of the distance (D1) between the proximal end 302A of the hollow profile 302 and the first end 306A of the threaded portion 306 to the length (L) of the hollow profile 302 (i.e the length between the proximal end 302A and the distal end 302B of the hollow profile 302) may be selected from a range of 1:5 to 1:2.5.

Further, as further shown in FIG. 9, the hollow profile 302 may include the first sealing member 310A and the second sealing member 310B. The first sealing member 310A may be provided along the first end 306A of the threaded portion 306, and the second sealing member 310B may be provided along the second end 306B of the threaded portion 306. Further, the first sealing member 310A may define the first tapered profile, and the second sealing member 310B may define the second tapered profile. The first sealing member 310A may be configured to abut against a first wall 614A defined, for example, on the inner sleeve surface 612. The second sealing member 310B may be configured to abut against a second wall 614B defined, for example, on the inner sleeve surface 612. The first tapered profile and the second tapered profile (of the first sealing member 310A and the second sealing member 310B, respectively) may match the respective first wall 614A and the second wall 614B, to create a leak-proof coupling of the drain-pipe interface device 301 with the opening 606. Further, in some configurations, the first sealing member 310A and the second sealing member 310B may include a sealant lining (not shown in FIGS. 6-9) to create the leak-proof coupling of the drain-pipe interface device 301 with the opening 606.

Figure 10:
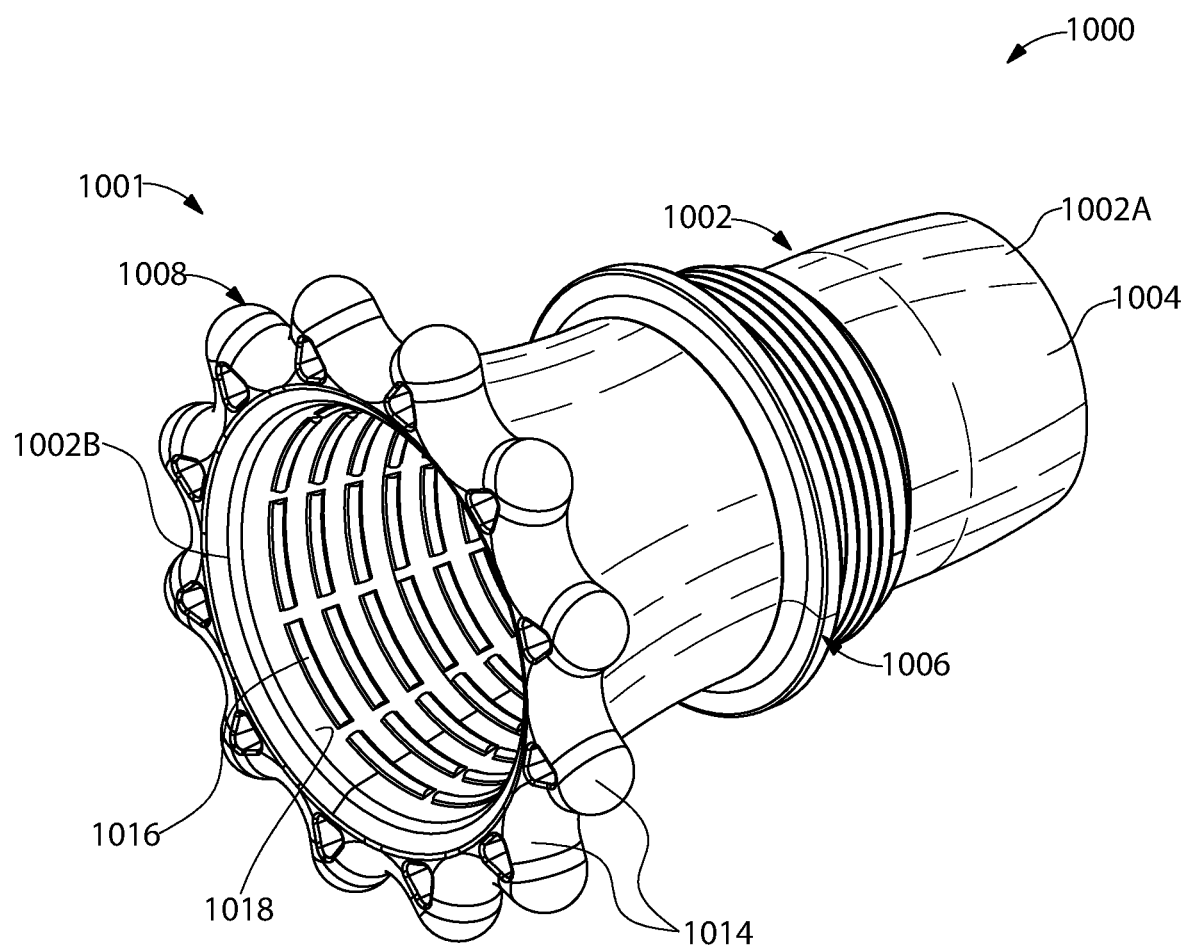
FIG. 10 illustrates a perspective view of a drain-pipe interface device, in accordance with some other illustrative configurations of the present disclosure.
Figure 11:
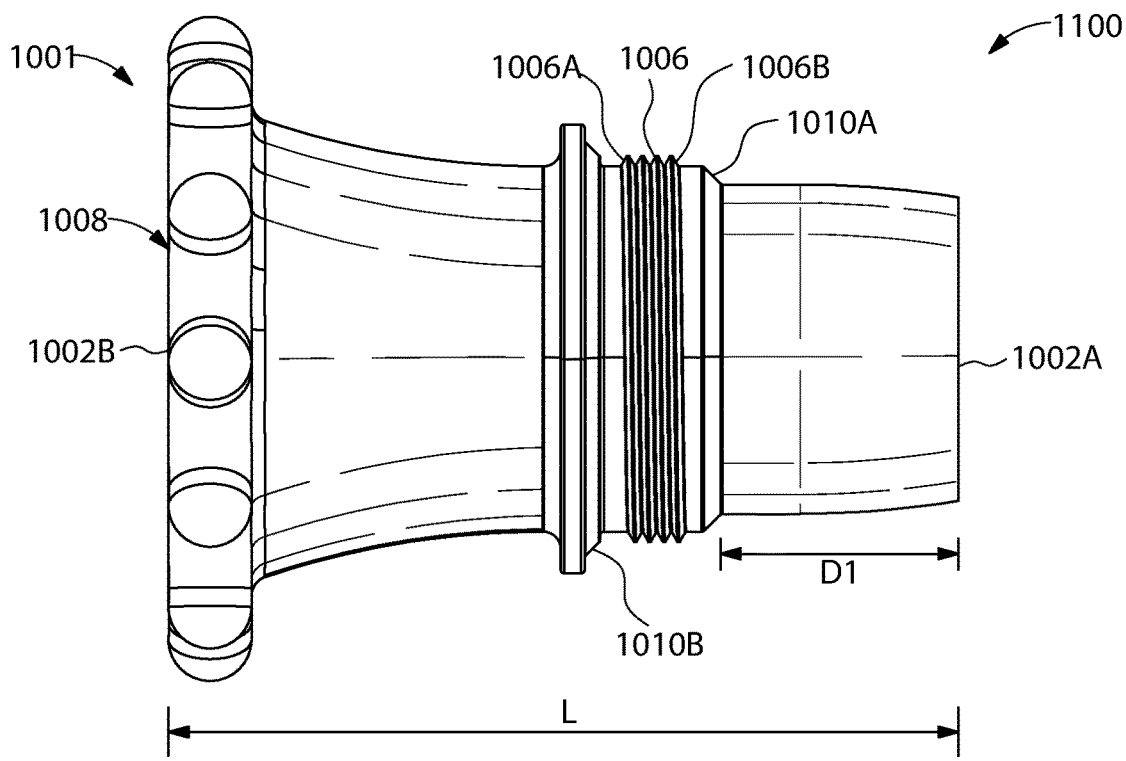
FIG. 11 illustrates a side view of the drain-pipe interface device of FIG. 10, in accordance with some other illustrative configurations of the present disclosure.
Figure 12:
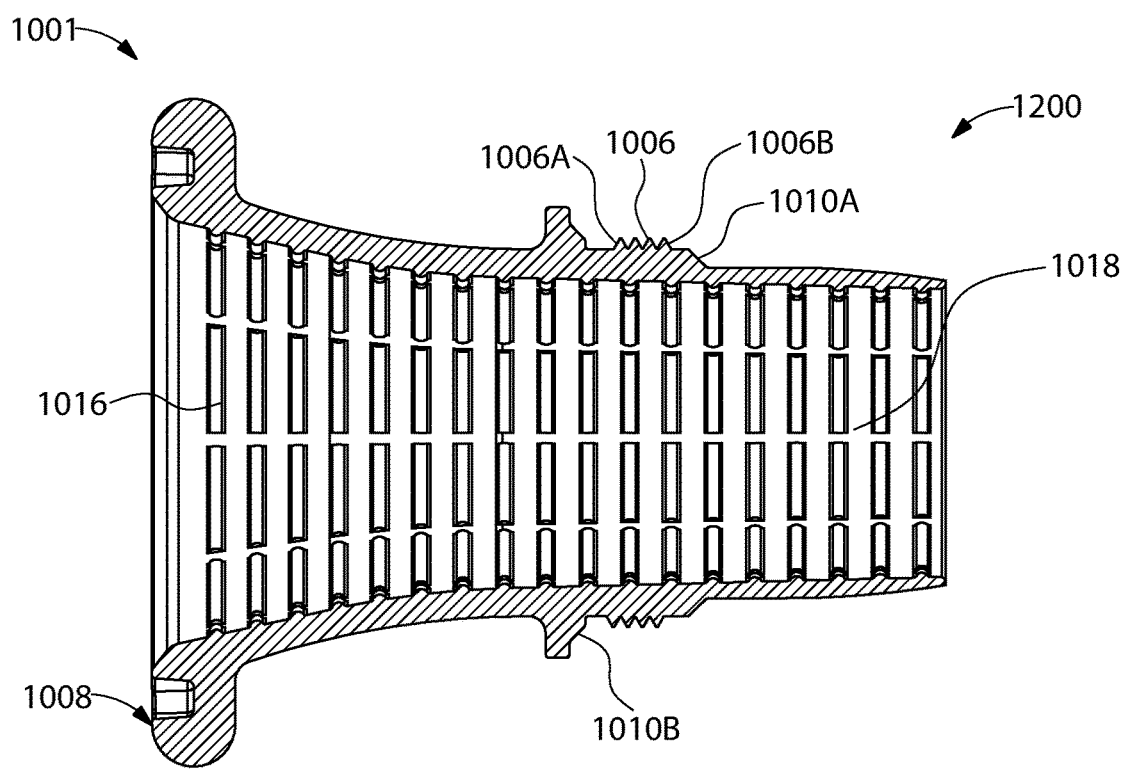
FIG. 12 illustrates a sectional side view of the drain-pipe interface device of FIG. 10, in accordance with some other illustrative configurations of the present disclosure.
Figure 13:
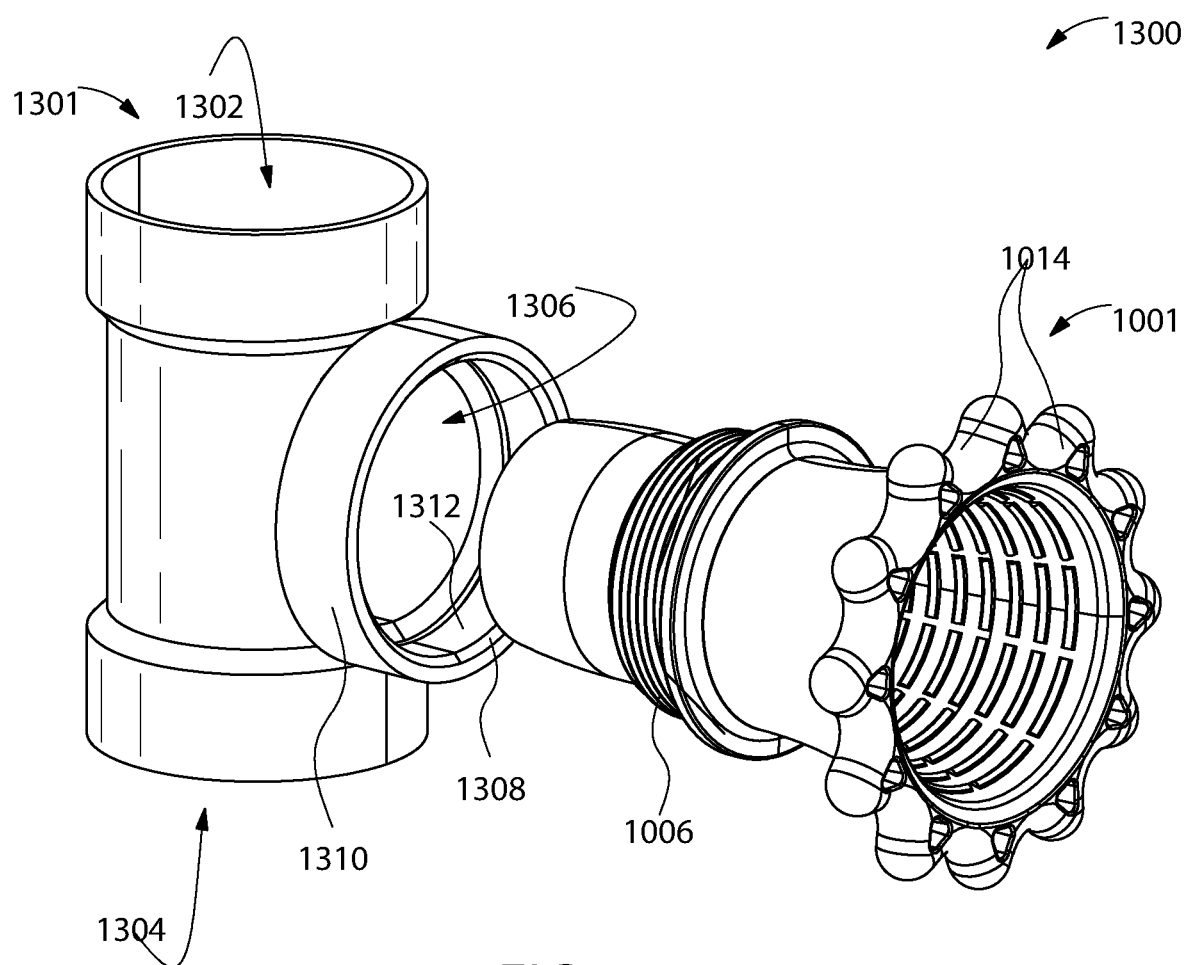
FIG. 13 illustrates an exploded view of an assembly of a T-connector and the drain-pipe interface device, in accordance with some illustrative other configurations of the present disclosure.
Figure 14:
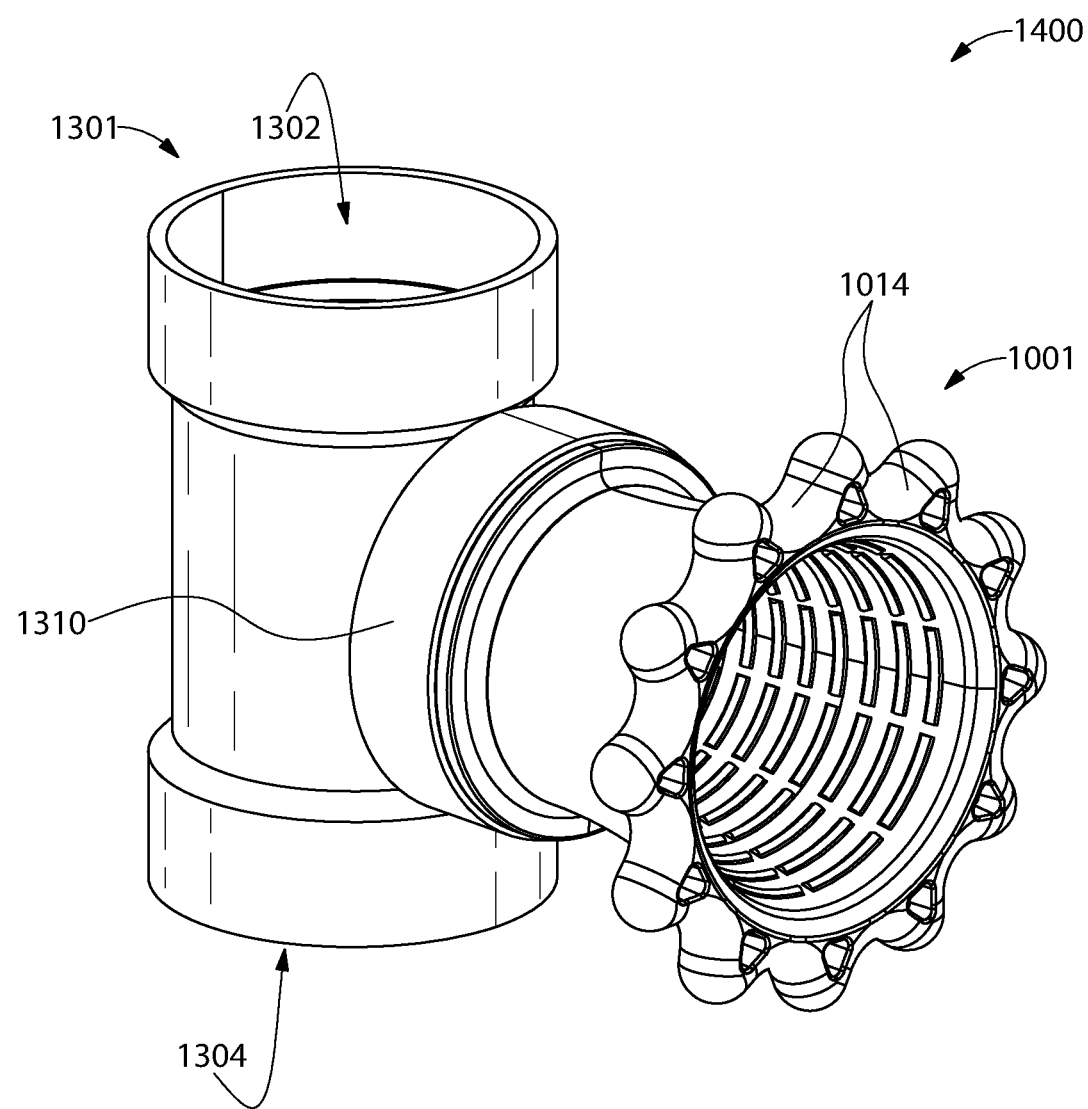
FIG. 14 illustrates an assembled view of an assembly of the T-connector and the drain-pipe interface device of FIG. 13, in accordance with some other illustrative configurations of the present disclosure.
Figure 15:
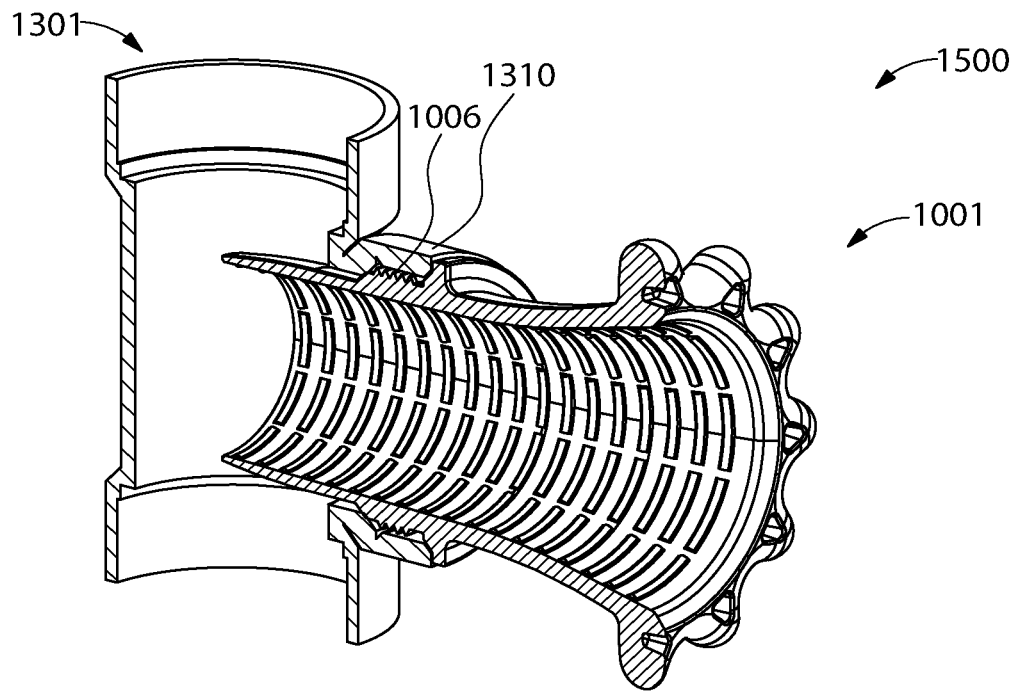
FIG. 15 illustrates an assembled sectional perspective view of the assembly of the T-connector and the drain-pipe interface device FIG. 13, in accordance with some other illustrative configurations of the present disclosure.

Referring now to FIGS. 10-12, a perspective view 1000, a side view 1100, and a sectional side view 1200 of a drain-pipe interface device 1001 (corresponding to the drain-pipe interface devices 106 and 301) are illustrated in accordance with some illustrative configurations of the present disclosure. The drain-pipe interface device 1001 may be manufactured from similar materials as the drain-pipe interface device 301 and as discussed above.

In some configurations, as shown in FIGS. 10-12, the drain-pipe interface device 1001 may include a hollow profile 1002. The hollow profile 1002 may have a circular cross-section, or any other cross-section, such as square, rectangle, etc. The hollow profile 1002 may include a proximal end 1002A and a distal end 1002B. The proximal end 1002A may define a first internal diameter, and the distal end 1002B may define a second internal diameter. The hollow profile 1002 may further include an outer surface 1004. As such, the hollow profile 1002 may have a tubular configuration extending between the first proximal end 1002A and the distal end 1002B.

In some configurations, the second internal diameter may be same as the first internal diameter. In other words, the diameter of the hollow profile 1002 may be uniform along its length. In some alternate configurations, as shown in FIGS. 11-12, the second internal diameter may be greater than the first internal diameter. In other words, the diameter of the hollow profile 1002 may vary along its length. In some configurations, a cross-section of the hollow profile 1002 between the proximal end 1002A and the distal end 1002B may be configured in an exponential taper profile. In some configurations, as can be seen in FIG. 12, the hollow profile 1002 may flare towards distal end 1002B. In other words, the diameter of the hollow profile 1002 may substantially increase towards the distal end 1002B, to provide an enlarged region for easy of feeding of the servicing equipment. In some configurations (not shown in FIGS. 11-12), the cross-section of the hollow profile 1002 between the proximal end 1002A and the distal end 1002B may be configured in linear taper profile. In the hollow profile 1002 configured with the linear taper profile, the diameter of the hollow profile 1002 increases linearly towards the distal end. Further, in some configurations (not shown in FIGS. 11-12), the cross-section of the hollow profile 1002 between the proximal end 1002A and the distal end 1002B may be configured in part uniform and part varying profile. As such, a first part length (e.g. half length) of the hollow profile 1002 may be configured with a uniform diameter, and the second part length (e.g. remaining half length) of the hollow profile 1002 may be configured with a varying diameter. In one such example configuration, for the second part length, the diameter of the hollow profile 1002 may increase linearly towards the distal end. In another example configuration, for the second part length, the diameter of the hollow profile 1002 may increase exponentially towards the distal end.

The hollow profile 1002 may further include a threaded portion 1006 located on the outer surface 1004, and located between the proximal end 1002A and the distal end 1002B of the hollow profile 1002. The threaded portion 1006 may extend between a first end 1006A thereof towards the proximal end 1002A of the hollow profile 1002 and a second end 1006B thereof towards the distal end 1002B of the hollow profile 1002. In some configurations, the threaded portion 1006 may be formed on the outer surface 1004 of the hollow profile 1002. For example, the threaded portion 1006 may be formed on the outer surface 1004 during manufacturing by way of molding, or post-manufacturing by way of machining. In some configurations, a ratio of a distance (D1) between the proximal end 1002A of the hollow profile 1002 and the first end 1006A of the threaded portion 1006 to a length (L) of the hollow profile 1002 (i.e the length between the proximal end 1002A and the distal end 1002B of the hollow profile 1002) may range from 1:5 to 1:2.5. In one particular example, the length (L) of the hollow profile 1002 may be 200 millimeters (mm) and the distance (D1) between the proximal end 1002A of the hollow profile 1002 and the first end 1006A of the threaded portion 1006 may be 50 mm. For the length (L) of the hollow profile 1002 being 200 mm, the distance (D1) may range from 40 mm to 80 mm. As such, the ratio of the length (L) to the distance (D1) may range from 1:5 to 1:2.5. It should be noted that the distance (D1) is significant for one or more reasons. Once the drain-pipe interface device 1001 is coupled to the opening of the drain-pipe, a part of the length (L) of the hollow profile 1002 acts as an overhang within the drain-pipe. The overhang helps curtail the egress of waste-water, for example from a toilet, through the opening, to thereby prevent the waste-water from coming into contact with the servicing personnel positioned in proximity to the opening.

As shown in FIG. 11, in some configurations, the proximal end 1002A of the hollow profile 1002 may include a lip (not shown in FIG. 11) defined along a circular periphery of the proximal end 1002A. For example, the lip may be similar to the lip 312, as shown in FIG. 3.

In continued reference to FIGS. 10 and 12, to further assist in shaking off and therefore minimizing egress of the waste-water and other waste particles, in some configurations, the hollow profile 1002 may include a plurality of ribs 1016 provided along an inner surface 1018 of the hollow profile 1002. Each of the plurality of ribs 1016 may include a protrusion projecting from the inner surface 1018 of the hollow profile 1002. The plurality of ribs 1016 may be formed into the hollow profile 1002, for example, via molding, or attached (i.e. post-manufacturing) to the inner surface 1018 of the hollow profile 1002, for example, via welding, gluing, etc. The plurality of ribs 1016 may be so configured to restrict the egress of water flowing through the drain-pipe, through the drain-pipe interface device 1001 when the drain-pipe interface device 1001 is coupled with the opening. Further, the plurality of ribs 1016 may be configured to shake-off impurities from the cleaning-snake during removal of the cleaning-snake from the drain-pipe via the drain-pipe interface device 1001. The plurality of ribs 1016 may be spaced apart from each other by a distance, to allow the waste-water and the impurities that are shaken-off from the cleaning-snake to slide back into the drain-pipe, via these spaces between the plurality of ribs 1016. In some configuration, each of the plurality of ribs 1016 may have a rounded head, or any other shape that facilitates easy feeding and removing of the servicing equipment from the drain-pipe. Further, each of the ribs 1016 may have a rectangular, or a square, or a circular, or a triangular, shape. In some example configurations, the ribs 1016 may be positioned equidistant from each other.

In some configurations, the hollow profile 1002 may further include one or more sealing members 1010 defined on the outer surface 1004 of the hollow profile 1002. The one or more sealing members 1010 may be configured to abut against a respective wall defined on the opening, to create a leak-proof coupling of the drain-pipe interface device with the opening. In some configurations, as shown in FIGS. 11-12, the one or more sealing members 1010 may include a first sealing member 1010A and a second sealing member 1010B. The first sealing member 1010A may be provided along the first end 1006A of the threaded portion 1006. The second sealing member 1010B may be provided along the second end 1006B of the threaded portion 1006. In some configurations, the first sealing member 1010A and the second sealing member 1010B may be formed on the outer surface 1004 of the hollow profile 1002. The first sealing member 1010A may define a first tapered profile. The second sealing member 1010B may defines a second tapered profile. It should be noted that the first tapered profile and the second tapered profile may match the respective walls defined on the opening, so as abut against the respective walls and create a leak-proof coupling of the drain-pipe interface device 1001 with the opening. In some configurations, the first sealing member 1010A and the second sealing member 1010B may include a sealant lining (not shown in FIGS. 10-12) to create the leak-proof coupling of the drain-pipe interface device 1001 with the opening. As will be understood, the sealant lining may be configured to act like a gasket between the first sealing member 1010A or the first sealing member 1010A and the respective wall of the opening. For example, the sealant lining may be made of a soft plastic or a polymer, such as silicone.

The drain-pipe interface device 1001 may further include a handle 1008 provided at the hollow profile 1002 at the distal end 1002B of the hollow profile 1002. In some configurations, the handle 1008 may be fixedly attached to the hollow profile 1002. Alternately, the handle 1008 may be formed with the hollow profile 1002, i.e. the hollow profile 1002 and the handle 1008 may be formed (manufactured) as a single piece. It should be noted that the drain-pipe interface device 1001 may be configured to be coupled with the opening via the threaded portion, upon rotation of the hollow profile 1002 by manipulating the handle 1008. In some configurations, as shown in FIGS. 10-12, the handle 1008 may include a plurality of knob elements 1014 defined around a circular profile. The handle 1008 may be manipulated via the plurality of knob elements 1014, as the knob elements 1014 allow for easy gripping and rotating by a user, so as to tightly couple the drain-pipe interface device 1001 with the opening. As will be understood, the knob elements 1014 may be either attached (post-manufacturing) to the hollow profile 1002 or may be formed within the hollow profile 1002 during manufacturing of the hollow profile 1002. Further, the shape, size, and number of the knob elements 1014 may vary depending on the size of overall size of the drain-pipe interface device 1001. For example, as shown in FIGS. 10-5, the plurality of knob elements 1014 may include 12 knob elements. It should be further noted that the material of the handle and hence the knob elements 1014 may be same as the material of the drain-pipe interface device 1001, and as already described above.

Referring now to FIGS. 13-16, an exploded view 1300, an assembled view 1400, an assembled sectional perspective view 1500, and an assembled sectional side view 11300 of an assembly of a T-connector 1301 and the drain-pipe interface device 1001 are illustrated in accordance with some illustrative configurations of the present disclosure. In some configurations, as shown in FIGS. 13-16, the T-connector 1301 may include a first outlet 1302, a second outlet 1304, and an opening 1306 (corresponding to the opening 108). The first outlet 1302 may be configured to be attached to a first section of the drain-pipe (e.g. the drain 101). The second outlet 1304 may be configured to be attached to a second section of the drain-pipe. The opening 1306 may define a threaded-region 1308. In some configurations, the T-connector 1301 may include a sleeve 1310 projecting away from the drain-pipe (when fitted to the drain-pipe). The sleeve 1310 may include an inner sleeve surface 1312. In such configurations, the threaded-region may be defined on the inner sleeve surface 1312.

As mentioned above, the hollow profile 1002 of the drain-pipe interface device 1001 includes a threaded portion 1006 located on its outer surface 1004. The threaded portion 1006 may be configured to engage with the threaded-region 1308 defined on the opening 1306 associated with the T-connector 1301, to couple the drain-pipe interface device 1001 with the opening 1306. It should be noted that the T-connector 1301 may be off-shelf available product having standard dimensions. Further, the T-connector 1301 may be available in different standard shapes and sizes. Accordingly, the drain-pipe interface device 1001 may be manufactured with standard dimensions to match the T-connector 1301. Therefore, when the drain-pipe is to be serviced, the servicing personnel (e.g. a plumber) may first temporarily install the drain-pipe interface device 1001 on the drain-pipe, before performing the service, for the reasons discussed above. In order to couple drain-pipe interface device 1001 with the opening 1306 (of the T-connector 1301, the drain-pipe interface device 1001 may be first aligned with the opening 1306, and then rotated to cause the threaded portion 1006 to engage with the threaded-region 1308 defined on the opening 1306 associated with the T-connector 1301, to couple the drain-pipe interface device 1001 with the T-connector 1301. Thereafter, the handle 1008 may be manipulated via the plurality of knob elements 1014 to tightly couple the drain-pipe interface device 1001 with the opening. In some configurations, the threaded-region 1308 may include tapered National Pipe Thread (NPT) thread or National Pipe Straight Mechanical (NPSM) thread.

Figure 16:
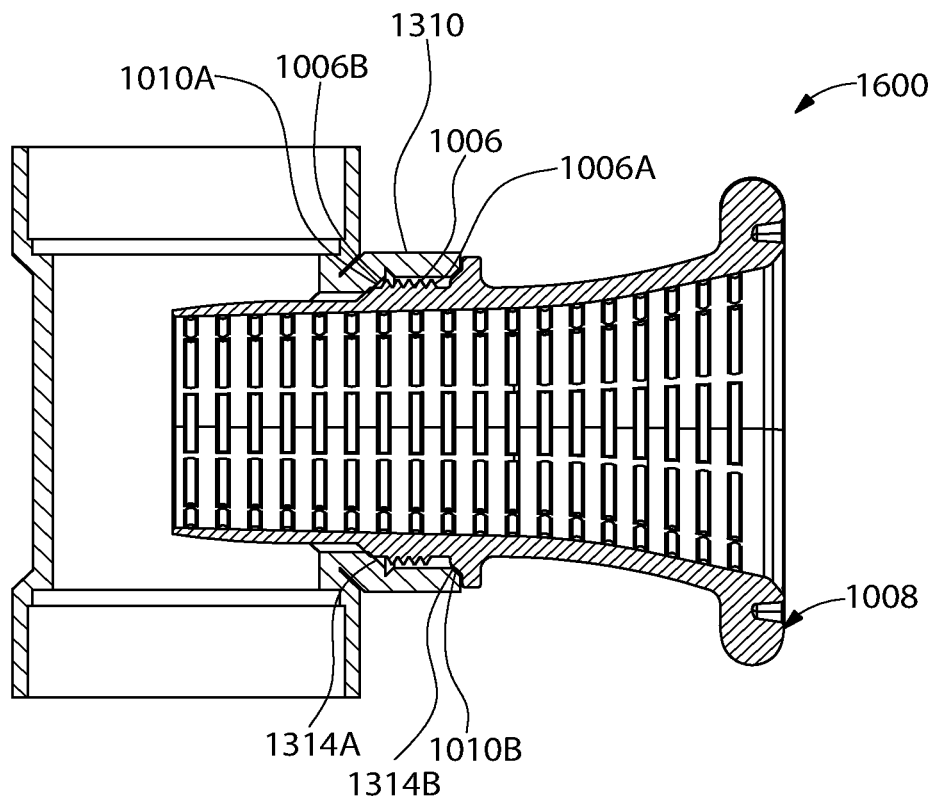
FIG. 16 illustrates an assembled sectional side view of the assembly of the T-connector and the drain-pipe interface device FIG. 13, in accordance with some other illustrative configurations of the present disclosure.

As shown in FIG. 16, and as mentioned above, once the drain-pipe interface device 1001 is coupled to the opening 1306, a part of the length (L) of the hollow profile 1002 acts as an overhang within the drain-pipe. The overhang helps deviate the flow of water (e.g. waste water) in the drain-pipe. By deviating the flow, the overhang curtails the egress of waste-water, for example from a toilet, through the opening 1306, to thereby prevent the waste-water from coming into contact with the servicing personnel positioned in proximity to the opening 1306. To allow this overhang, a ratio of the distance (D1) between the proximal end 1002A of the hollow profile 1002 and the first end 1006A of the threaded portion 1006 to the length (L) of the hollow profile 1002 (i.e, the length between the proximal end 1002A and the distal end 1002B of the hollow profile 1002) may be selected from a range of 1:5 to 1:2.5. Further, it should be noted that the length of the overhang should be selected which does not restrict the passage of the servicing equipment through the drain-pipe interface device 1001 and the drain-pipe. Therefore, the length of the overhang may be a balance between the length required to effectively deviate the flow of wastewater and at the same time allow passage of the servicing equipment.

Further, as further shown in FIG. 16, the hollow profile 1002 may include the first sealing member 1010A and the second sealing member 1010B. The first sealing member 1010A may be provided along the first end 1006A of the threaded portion 1006, and the second sealing member 1010B may be provided along the second end 1006B of the threaded portion 1006. Further, the first sealing member 1010A may define the first tapered profile, and the second sealing member 1010B may define the second tapered profile. The first sealing member 1010A may be configured to abut against a first wall 1314A defined, for example, on the inner sleeve surface 1312. The second sealing member 1010B may be configured to abut against a second wall 1314B defined, for example, on the inner sleeve surface 1312. The first tapered profile and the second tapered profile (of the first sealing member 1010A and the second sealing member 1010B, respectively) may match the respective first wall 1314A and the second wall 1314B, to create a leakproof coupling of the drain-pipe interface device 1001 with the opening 1306. Further, in some configurations, the first sealing member 1010A and the second sealing member 1010B may include a sealant lining (not shown in FIGS. 13-16) to create the leak-proof coupling of the drain-pipe interface device 1001 with the opening 1306.

Figure 17:
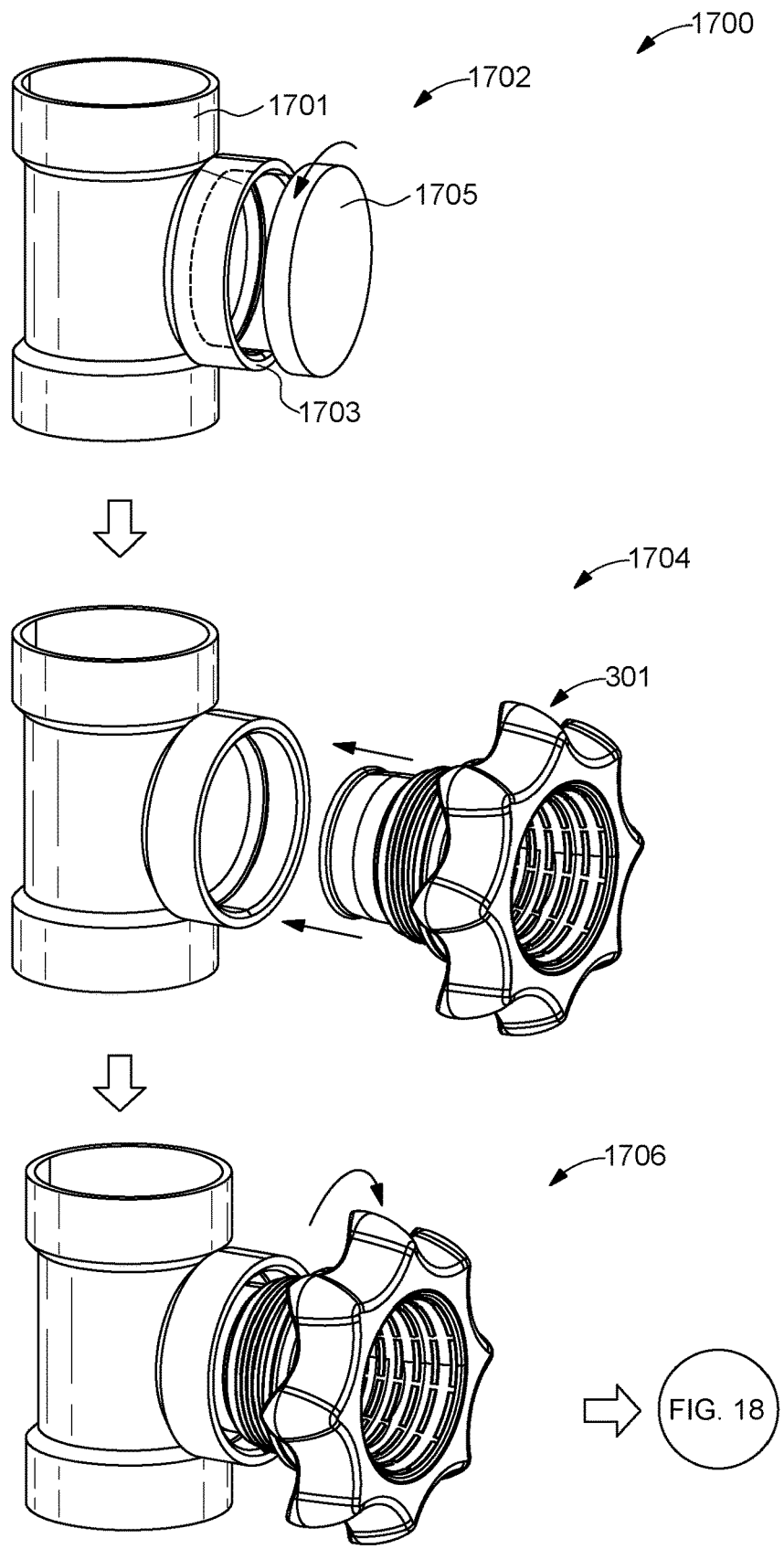
FIGS. 17-18 illustrate a process diagram of a process of servicing a drain-pipe, in accordance with some other illustrative configurations of the present disclosure.
Figure 18:
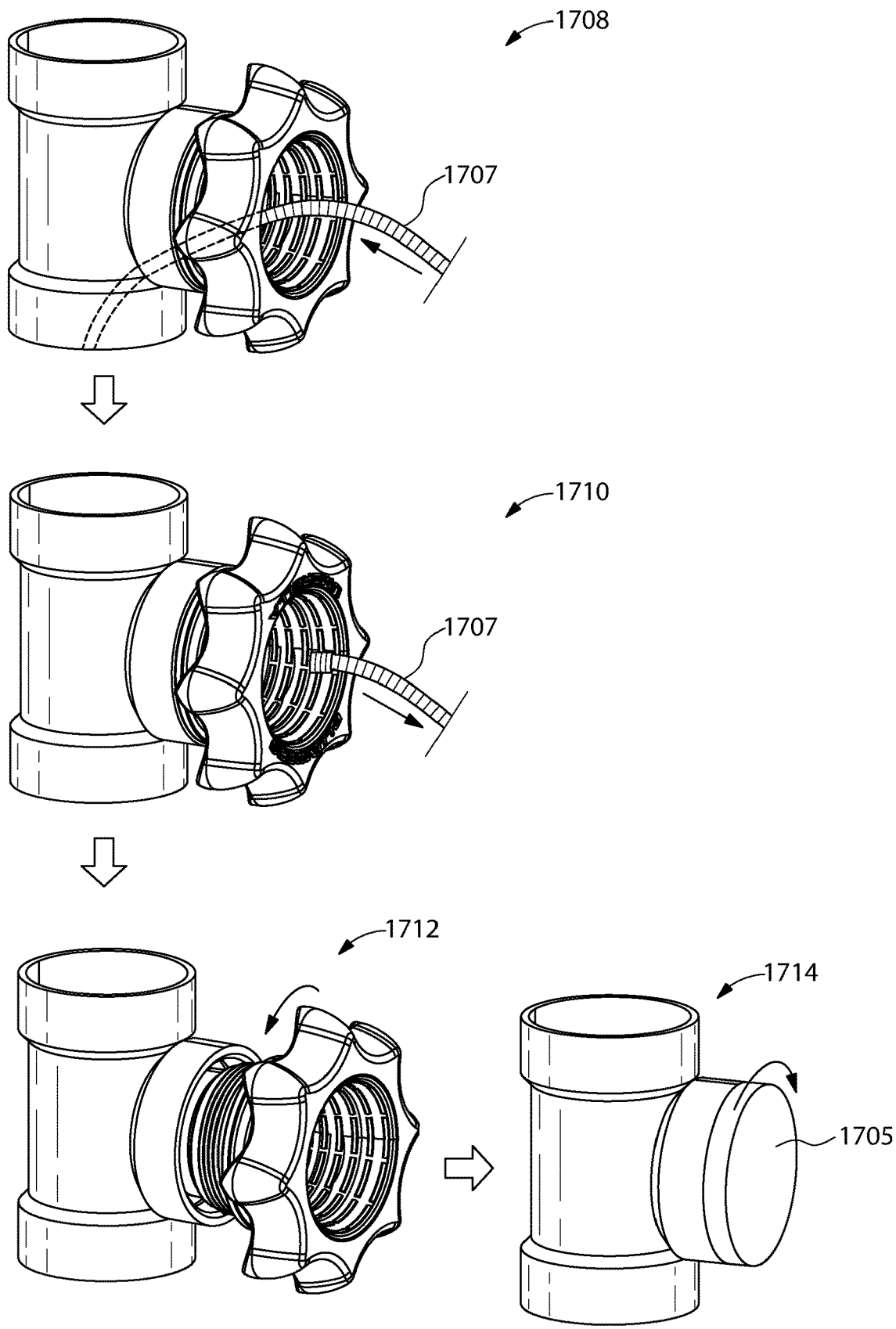
Figure 19:
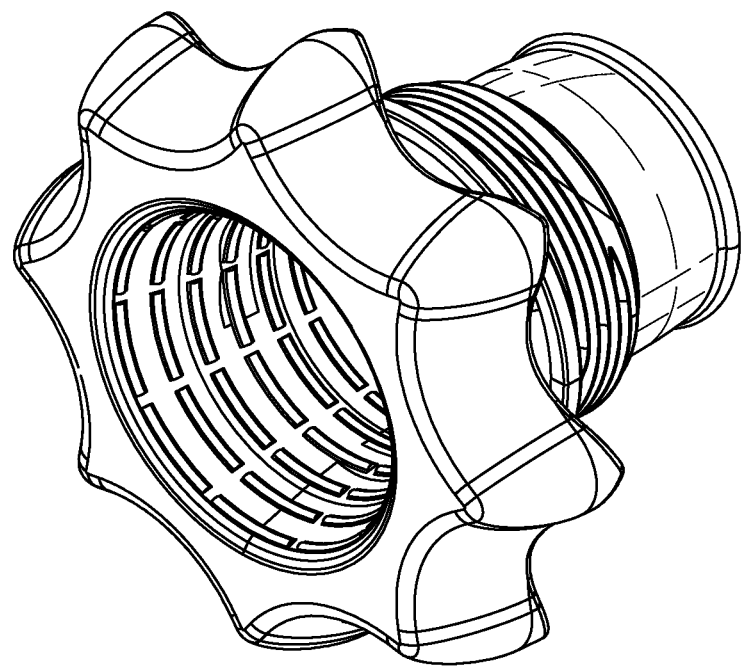
FIGS. 19-25 illustrate different views (i.e., a left side view, a right side view, a front view, a rear view, a top view, and a bottom view, respectively) of a drain-pipe interface device (corresponding to the drain-pipe interface device of FIG. 3), in accordance with some configurations of the present disclosure.
Figure 20:
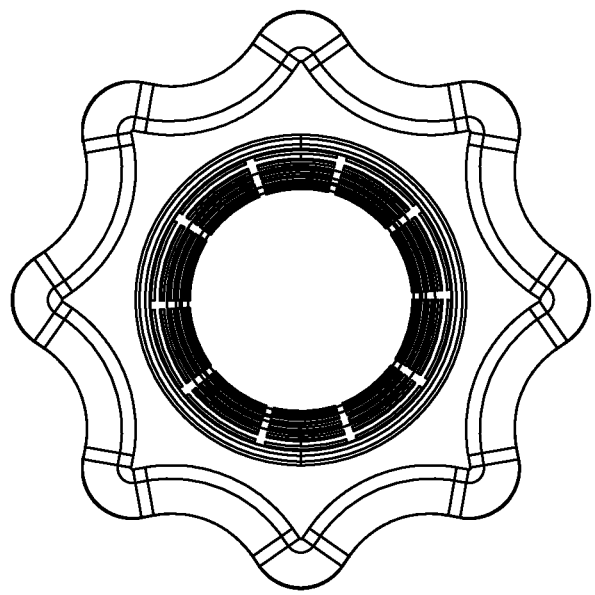
Figure 21:
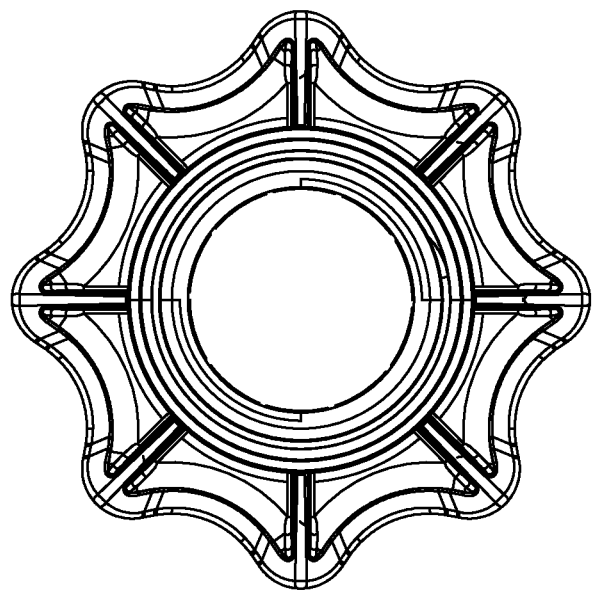
Figure 22:
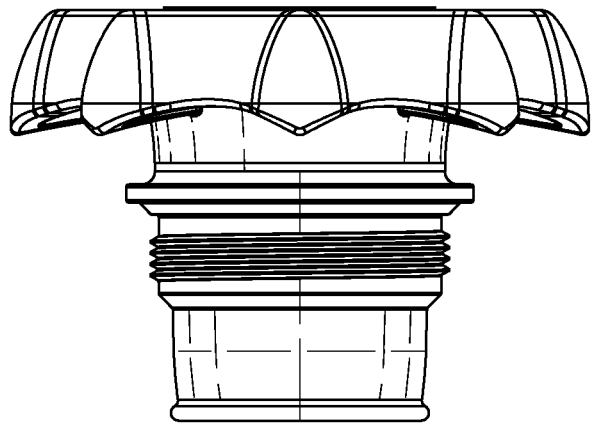
Figure 23:
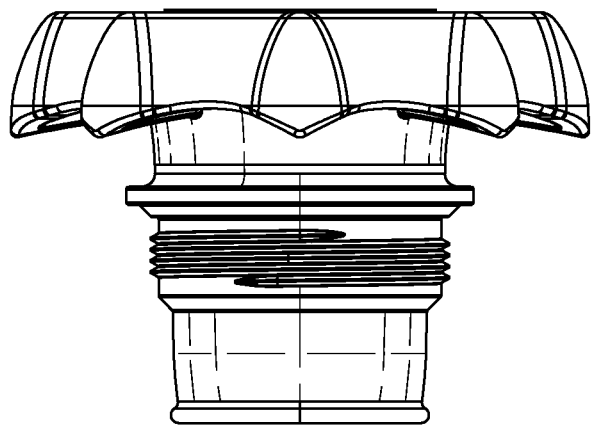
Figure 24:
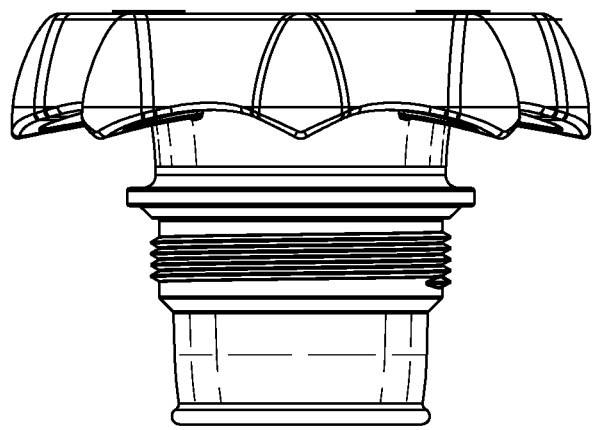
Figure 25:
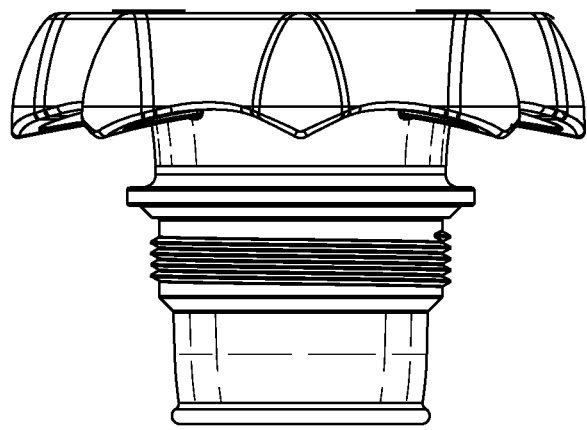
Figure 26:
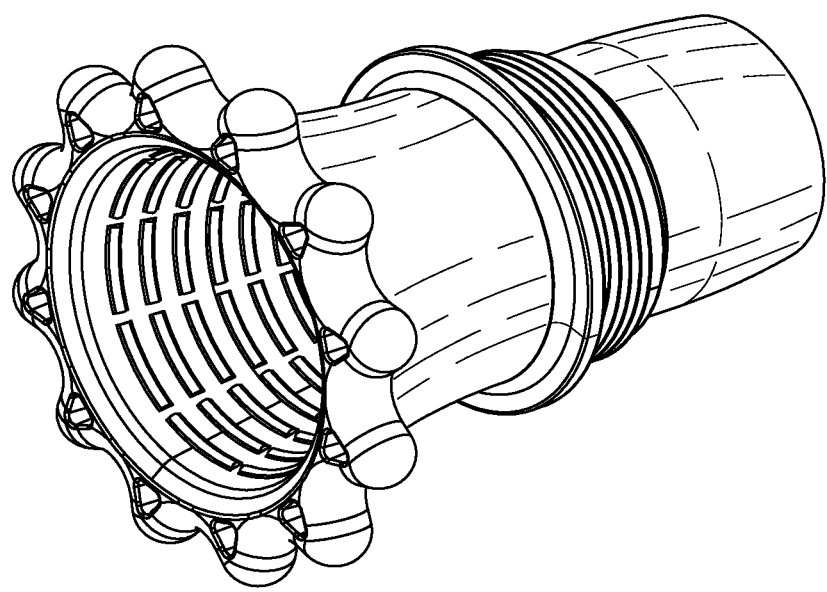
FIGS. 26-32 illustrate different views (i.e., a left side view, a right side view, a front view, a rear view, a top view, and a bottom view, respectively) of a drain-pipe interface device (corresponding to the drain-pipe interface device of FIG. 13), in accordance with some configurations of the present disclosure.
Figure 27:
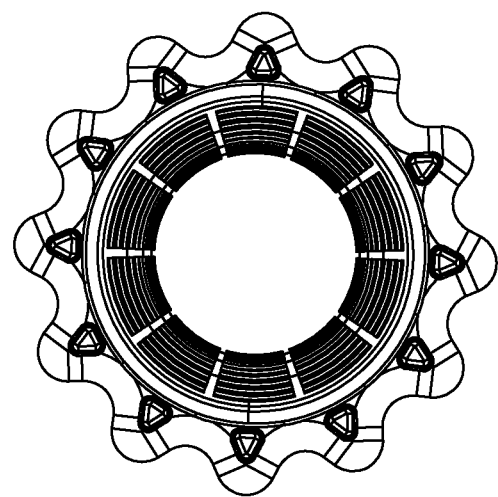
Figure 28:
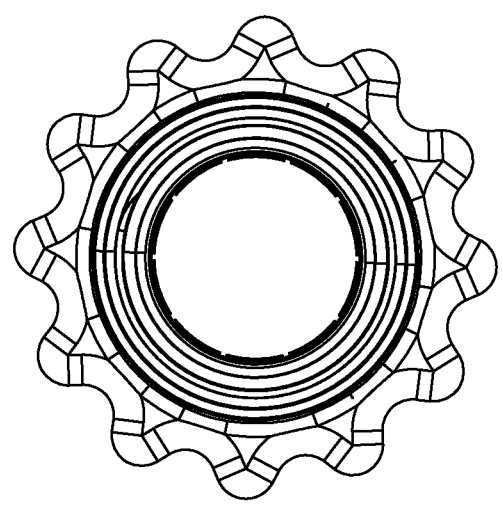
Figure 29:
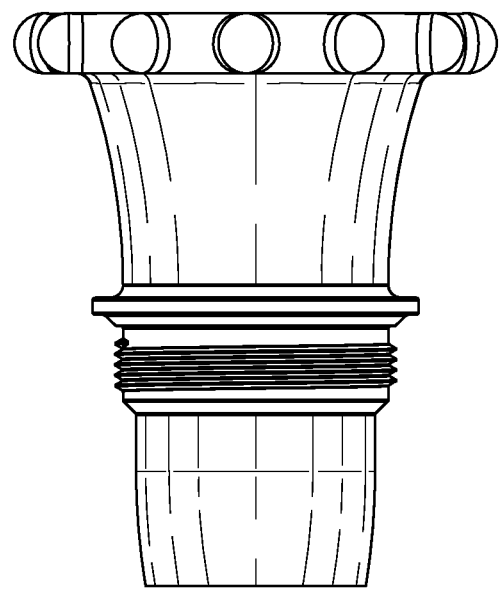
Figure 30:
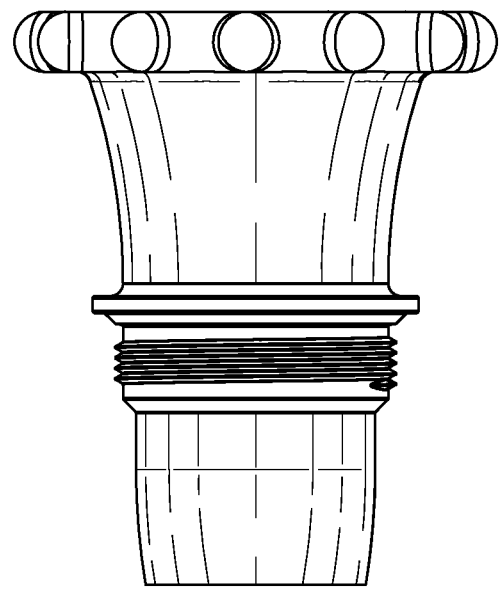
Figure 31:
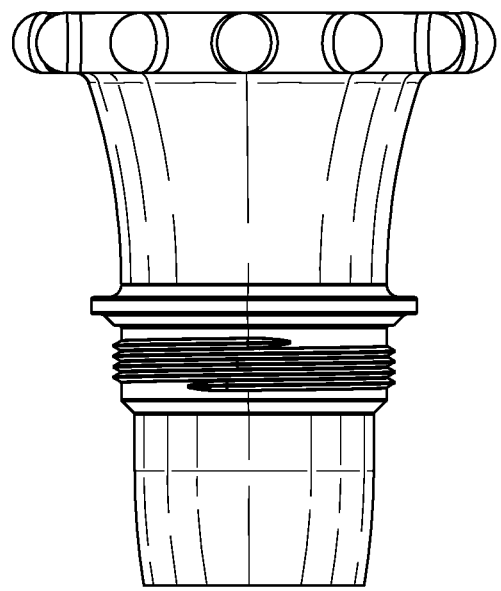
Figure 32:
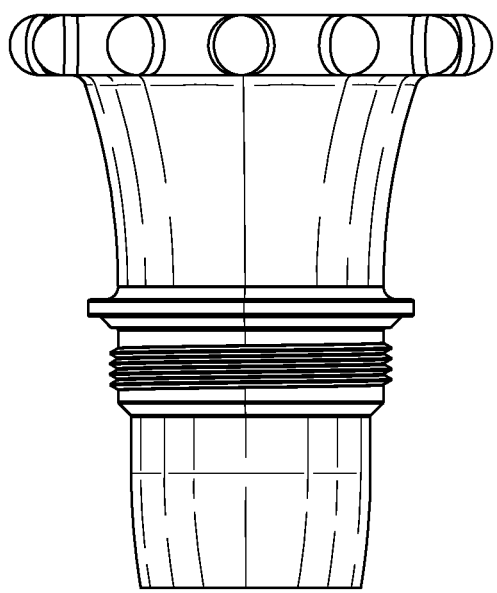

Referring now to FIGS. 17-18, a process diagram of a process 1700 of servicing a drain-pipe 1701 using the drain-pipe interface device 301 is illustrated, in accordance with some illustrative configurations of the present disclosure. At step 1702, a lid 1703 provided on an opening 1705 associated with the drain-pipe 1701 may be removed. In order to remove the lid 1703, the lid 1703 may be rotated relative to the opening 1705 in one of an anti-clockwise direction and a clockwise-direction. For example, in order to be removed, the lid 1703 may be rotated relative to the opening 1705 in the anti-clockwise direction.

At step 1704, the drain-pipe interface device 301 may be aligned with the opening 1705. The drain-pipe interface device 301 is already discussed in detail in the above sections of the present disclosure. At step 1706, upon aligning, the drain-pipe interface device 301 may be rotated relative to the opening 1705 to couple the drain-pipe interface device 301 with the opening 1705 via the threaded portion 306, for example, by manipulating the handle 308. In order to the couple the drain-pipe interface device 301 with the opening 1705, the drain-pipe interface device 301 may be rotated relative to the opening 1705 in the other of the anti-clockwise direction and the clockwise-direction. For example, in order to couple the drain-pipe interface device 301 with the opening 1705, the drain-pipe interface device 301 may be rotated relative to the opening 1705 in the clockwise-direction.

At step 1708, upon coupling of the drain-pipe interface device 301 with the opening 1705, a servicing equipment (e.g. a cleaning-snake) 1707 may be inserted in the drain-pipe 1701 via the drain-pipe interface device 301, for servicing the drain-pipe 1701. At step 1710, once the servicing is complete, the servicing equipment 1707 may be removed from the drain-pipe 1701. At step 1712, the handle (i.e. handle 308) of the drain-pipe interface device 301 may be rotated relative to the opening 1705, to decouple the drain-pipe interface device 301 from the opening 1705. For example, in order to the decouple the drain-pipe interface device 301 from the opening 1705, the drain-pipe interface device 301 may be rotated relative to the opening 1705 in the anti-clockwise direction. At step 1714, upon decoupling the drain-pipe interface device 301 from the opening 1705, the lid 1703 may be restored on the opening 1705. For example, in order to restore the lid 1703, the lid 1703 may be rotated relative to the opening 1705 in the clockwise-direction.

Referring now to FIG. 19-25, showing views of a drainpipe interface device. As previously mentioned (in the Brief Description of the Drawings), the illustrated configuration may have extraneous details. It is understood that in further filings and prosecution, various limiting details may be removed, resulting in a broader configuration. For example, provided for illustrative purposes only, a drain-pipe interface device configuration may delete the knobs 314 (FIG. 3) or delete one of the first sealing member 310A and the second sealing member 310B.

Referring now to FIG. 26-32, showing views of another drain-pipe interface device. As previously mentioned (in the Brief Description of the Drawings), the illustrated configuration may have extraneous details. It is understood that in further filings and prosecution, various limiting details may be removed, resulting in a broader configuration.

It is intended that the disclosure and examples be considered as illustrative only, with a true scope and spirit of disclosed configurations being indicated by the following claims and amendments made thereto in the original application, divisional applications, continuations application, and/or foreign applications.

What is claimed is:
1. A drain-pipe interface device comprising:
  a hollow profile, comprising:
    a proximal end defining:
      a first internal diameter;
    a distal end defining:
      a second internal diameter,
        wherein a cross-section of the hollow profile between the proximal end and the distal end is configured in a taper profile with the second internal diameter greater than the first internal diameter;
    an inner surface;
    a plurality of protrusions located on the inner surface and configured to restrict egressing of water flowing through the drain-pipe;
    an outer surface;

a threaded portion located on the outer surface and between the proximal end and the distal end of the hollow profile, wherein the threaded portion extends between:
   a first end thereof towards the proximal end of the hollow profile; and
   a second end thereof towards the distal end of the hollow profile;
   wherein the threaded portion is configured to engage with a threaded-region defined on an opening associated with a drain-pipe, to couple the drain-pipe interface device with the opening; and
at least one sealing member defined on the outer surface of the hollow profile,
   wherein the at least one sealing member is configured in a sealing tapered profile,
   wherein the at least one sealing member is configured to abut against a respective wall defined on the opening, to create a leak-proof coupling of the drain-pipe interface device with the opening; and
a handle attached to the hollow profile at the distal end of the hollow profile;
   wherein the drain-pipe interface device is configured to be coupled with the opening via the threaded portion, upon rotation of the hollow profile by manipulating the handle.

2. The drain-pipe interface device of claim 1, wherein the handle comprises:
   a plurality of knob elements defined around a circular profile;
   wherein the handle is configured to be manipulated via the plurality of knob elements.

3. The drain-pipe interface device of claim 1, wherein the taper profile of the hollow profile is configured in an exponential taper profile.

4. The drain-pipe interface device of claim 1, wherein the at least one sealing member comprises:
   a second sealing member provided along the second end of the threaded portion.

5. The drain-pipe interface device of claim 4,
   wherein the second sealing member defines a second sealing tapered profile.

6. The drain-pipe interface device of claim 1, wherein a ratio of a distance (D1) between the proximal end of the hollow profile and the first end of the threaded portion to a length (L) of the hollow profile between the proximal end and the distal end thereof is selected from a range of 1:5 to 1:2.5.

7. The drain-pipe interface device of claim 1, wherein the proximal end of the hollow profile comprises:
   a lip defined along a circular periphery of the proximal end.

8. The drain-pipe interface device of claim 1, wherein the plurality of protrusions on the inner surface comprises:
   a plurality of ribs provided along the inner surface;
   wherein the plurality of ribs is further configured to shake-off impurities from a servicing equipment during removal of the servicing equipment from the drain-pipe via the drain-pipe interface device.

9. The drain-pipe interface device of claim 1, wherein the distal end of the hollow profile comprises:
   a tapered profile along a circular periphery of the distal end.

10. The drain-pipe interface device of claim 1, wherein the opening comprises:
   a sleeve projecting away from the drain-pipe, the sleeve comprising:
      an inner sleeve surface;
      wherein the threaded-region is defined on the inner sleeve surface.

11. The drain-pipe interface device of claim 1,
   wherein the proximal end of the hollow profile is configured to be inserted into the opening of a T-shaped connector, wherein the T-shaped connector, comprises:
      a first outlet for receiving a first section of the drain-pipe;
      a second outlet for receiving a second section of the drain-pipe, the second outlet being oriented opposite to the first outlet; and
      the opening associated with the drain-pipe, the opening defining the threaded-region.

12. The drain-pipe interface device of claim 9, wherein a material of the drain-pipe interface device is a Thermoplastic Polyurethane (TPU) having a Shore hardness in a range of 70 to 95.

13. An apparatus for servicing a drain-pipe, the apparatus comprising:
   a T-shaped connector, comprising:
      a first outlet configured to be attached to a first section of the drain-pipe;
      a second outlet configured to be attached to a second section of the drain-pipe; and
      an opening associated with the drain-pipe, the opening defining a threaded-region; and
   a drain-pipe interface device configured to removably couple with the T-shaped connector, the drain-pipe interface device comprising:
      a hollow profile comprising:
         a proximal end defining:
            a first internal diameter;
            wherein the drain-pipe interface device is configured to be inserted into the opening of the T-shaped connector, via the proximal end;
         a distal end defining:
            a second internal diameter,
            wherein a cross-section of the hollow profile between the proximal end and the distal end is configured in a taper profile with the second internal diameter greater than the first internal diameter;
         an inner surface;
         a plurality of protrusions located on the inner surface and configured to restrict egressing of water flowing through the drain-pipe;
         an outer surface;
         a threaded portion located on the outer surface and between the proximal end and the distal end of the hollow profile, wherein the threaded portion extends between:
            a first end thereof towards the proximal end of the hollow profile; and
            a second end thereof towards the distal end of the hollow profile;
            wherein the threaded portion is configured to engage with the threaded-region defined on the opening, to couple the drain-pipe interface device with the T-shaped connector; and
         a handle defined at the distal end of the hollow profile;
            wherein the drain-pipe interface device is configured to be coupled with the T-shaped connector via the threaded portion, upon rotation of the hollow profile by manipulating the handle.

14. The apparatus of claim 13, wherein the opening comprises:

a sleeve projecting away from the drain-pipe, the sleeve comprising:
an inner sleeve surface;
wherein the threaded-region is defined on the inner sleeve surface.

15. The apparatus of claim 13, wherein a material of each of the T-shaped connector and the drain-pipe interface device is a Thermoplastic Polyurethane material having a Shore hardness in a range of 70 to 95.

16. The apparatus of claim 13, wherein the at least one sealing member comprises:
a first sealing member provided along the first end of the threaded portion, wherein the first sealing member defines a first tapered profile; and
a second sealing member provided along the second end of the threaded portion, wherein the second sealing member defines a second tapered profile.

17. A method of servicing a drain-pipe, the method comprising:
removing a lid provided on an opening associated with the drain-pipe;
aligning a drain-pipe interface device with the opening, wherein the drain-pipe interface device comprises:
a hollow profile comprising:
a proximal end defining:
a first internal diameter;
a distal end defining:
a second internal diameter,
wherein a cross-section of the hollow profile between the proximal end and the distal end is configured in a taper profile with the second internal diameter greater than the first internal diameter;
an inner surface;
a plurality of protrusions located on the inner surface and configured to restrict egressing of water flowing through the drain-pipe;
an outer surface;
a threaded portion located on the outer surface and between the proximal end and the distal end of the hollow profile, wherein the threaded portion extends between:
a first end thereof towards the proximal end of the hollow profile; and
a second end thereof towards the distal end of the hollow profile;
wherein the threaded portion is configured to engage with a threaded-region defined on the opening, to couple the drain-pipe interface device with the opening; and
at least one sealing member defined on the outer surface of the hollow profile,
wherein the at least one sealing member is configured in a sealing tapered profile,
wherein the at least one sealing member is configured to abut against a respective wall defined on the opening, to create a leak-proof coupling of the drain-pipe interface device with the opening; and
a handle attached to the hollow profile at the distal end of the hollow profile:
upon aligning, rotating the drain-pipe interface device relative to the opening to couple the drain-pipe interface device with the opening via the threaded portion, by manipulating the handle.

18. The method of claim 17, further comprising:
upon coupling of the drain-pipe interface device with the opening, inserting a servicing equipment in the drain-pipe via the drain-pipe interface device, for servicing the drain-pipe;
upon completion of the servicing, removing the servicing equipment from the drain-pipe;
rotating the handle of the drain-pipe interface device relative to the opening, to decouple the drain-pipe interface device from the opening; and
upon decoupling, restoring the lid on the opening.

19. The method of claim 18,
wherein removing the lid provided on the opening or decoupling the drain-pipe interface device from the opening comprises:
rotating the lid or the drain-pipe interface device, respectively, relative to the opening in one of an anti-clockwise direction and a clockwise-direction; and
wherein coupling the drain-pipe interface device with the opening or restoring the lid on the opening comprises:
rotating the drain-pipe interface device or the lid, respectively, relative to the opening in the other of the anti-clockwise direction and the clockwise-direction.

* * * * *